(12) United States Patent
Zamorano Senderos et al.

(10) Patent No.: US 12,049,701 B2
(45) Date of Patent: Jul. 30, 2024

(54) SYSTEMS AND METHODS FOR COLD SPRAY ADDITIVE MANUFACTURE WITH SUPERPLASTIC FORMATION DIFFUSION BONDING

(71) Applicant: The Boeing Company, Arlington, VA (US)

(72) Inventors: Bruno Zamorano Senderos, Huntsville, AL (US); Dennis Lynn Coad, Madison, AL (US); Daniel G. Sanders, Lake Tapps, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/363,890

(22) Filed: Aug. 2, 2023

(65) Prior Publication Data
US 2023/0383412 A1    Nov. 30, 2023

Related U.S. Application Data

(62) Division of application No. 16/890,898, filed on Jun. 2, 2020, now Pat. No. 11,753,723.

(51) Int. Cl.
*C23C 24/04* (2006.01)
*B21D 26/055* (2011.01)
(Continued)

(52) U.S. Cl.
CPC ............ *C23C 24/04* (2013.01); *B21D 26/055* (2013.01); *B33Y 10/00* (2014.12); *B33Y 30/00* (2014.12)

(58) Field of Classification Search
None
See application file for complete search history.

(56) References Cited

U.S. PATENT DOCUMENTS 5,302,414 A    4/1994  Alkhimov et al.
6,589,600 B1   7/2003  Hasz et al.
(Continued)

FOREIGN PATENT DOCUMENTS

EP       2226133 A2     9/2010
EP       3339474 A1     6/2018
WO    20140143260 A1    9/2014

OTHER PUBLICATIONS

Extended European Search Report, Application No. 21168300.8, Mailed Oct. 19, 2021, 10 Pages.

*Primary Examiner* — Michael P. Rodriguez
(74) *Attorney, Agent, or Firm* — Jordan IP Law, LLC

(57) ABSTRACT

Implementations are provided for fabricating a finished workpiece having a shaped portion. One implementation includes: a superplastic formation diffusion bonding (SPFDB) component; a cold spray additive manufacturing (CSAM) component; and a mold having a concavity. Various configurations can operate on a workpiece with the SPFDB and CSAM components in different orders. An implementation is configured to cold spray (with the CSAM component) an additive material onto the workpiece; and perform superplastic forming (with the SPFDB component) on the workpiece with the mold, thereby rendering the workpiece into the finished workpiece having the shaped portion. The shaped portion conforms to a shape defined by the concavity. Cold spraying results in an increased thickness of the finished workpiece in a target region, which can provide structural reinforcement, and which can have a tapered edge. The workpiece can be a metal substrate made of titanium, aluminum, stainless steel, or another material.

20 Claims, 18 Drawing Sheets

(51) Int. Cl.
  *B33Y 10/00* (2015.01)
  *B33Y 30/00* (2015.01)

(56) References Cited

U.S. PATENT DOCUMENTS

| | | | |
|---|---|---|---|
| 2010/0226778 A1* | 9/2010 | Wallis | B23K 20/16 |
| | | | 416/232 |
| 2013/0040757 A1 | 2/2013 | Deshmukh et al. | |
| 2014/0376996 A1 | 12/2014 | Kudo et al. | |
| 2016/0001407 A1* | 1/2016 | Hansen | F01D 5/288 |
| | | | 29/889.71 |

\* cited by examiner

SYSTEMS AND METHODS FOR COLD SPRAY ADDITIVE MANUFACTURE WITH SUPERPLASTIC FORMATION DIFFUSION BONDING

CROSS REFERENCE TO RELATED APPLICATIONS

This application is a Divisional of and claims the benefit of and priority to U.S. patent application Ser. No. 16/890,898 filed Jun. 2, 2020, the contents of which are incorporated by reference in its entirety.

BACKGROUND

Manufacturing of complex multi-curvature parts (e.g., doubly curved parts, such as curved in orthogonal dimensions) often requires the integration of multiple components and processes. Typically, a surface is formed by superplastic forming, hydroforming, incremental forming, or a similar technique. Unfortunately, superplastic forming can result in thin areas in the resulting shape. Because control of resulting thickness is often difficult, current methods impose limits on the shape and curvature of the features that can be formed. For example, with superplastic formation diffusion bonding (SPFDB), part thickness are increased with welded sheets in certain locations as reinforcement and to counter thinning. However, the incremental thickness is a function of the sheet thickness of available additive material, which may be more than is necessary. This limits configuration options and increases weight beyond what would be necessary if thickness could be more finely tuned.

Not only does the abrupt termination at the edge of an additive sheet create an undesirable step function in the thickness of a finished part, but the welds can have different superplastic behavior that limits options (e.g., location, size, and shape) for reinforcements. Thus, incremental sheet forming increases cost, complexity, fabrication time, and can increase weight beyond what is necessary.

SUMMARY

The disclosed examples are described in detail below with reference to the accompanying drawing figures listed below. The following summary is provided to illustrate implementations disclosed herein. It is not meant, however, to limit all examples to any particular configuration or sequence of operations.

Various implementations are provided for fabricating a finished workpiece having a shaped portion. An implementation includes: a superplastic formation diffusion bonding (SPFDB) component; a cold spray additive manufacturing (CSAM) component; and a mold having a concavity. Various configurations can operate on a workpiece with the SPFDB and CSAM components in different orders. An implementation is configured to cold spray (with the CSAM component) an additive material onto the workpiece; and perform superplastic forming (with the SPFDB component) on the workpiece with the mold, thereby rendering the workpiece into the finished workpiece having the shaped portion. The shaped portion conforms to a shape defined by the concavity. Cold spraying results in an increased thickness of the finished workpiece in a target region, which provide structural reinforcement, and which can have a tapered edge. The workpiece can be a metal substrate made of titanium, aluminum, stainless steel, or another material.

The features, functions, and advantages that have been discussed are achieved independently in various implementations or are to be combined in yet other implementations, further details of which are seen with reference to the following description and drawings.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
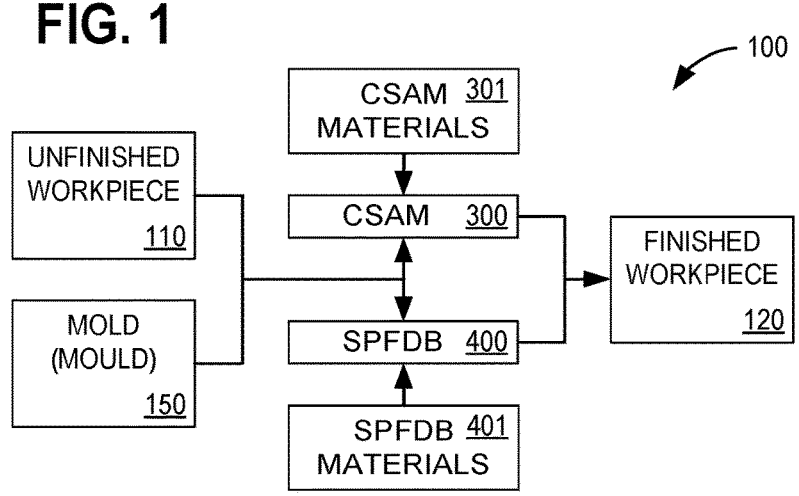
FIG. 1 illustrates a system for fabricating a finished workpiece by performing cold spray additive manufacture (CSAM) with superplastic formation diffusion bonding (SPFDB).

The various implementations will be described in detail with reference to the accompanying drawings. Wherever possible, the same reference numbers will be used throughout the drawings to refer to the same or like parts. References made throughout this disclosure relating to specific implementations and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation" or "an implementation" are not intended to be interpreted as excluding the existence of additional implementations that also incorporate the recited features. Moreover, unless explicitly stated to the contrary, implementations "comprising" or "having" an element or a plurality of elements having a particular property could include additional elements not having that property.

Aspects of the disclosure simplify the manufacture of complex structures using cold spray additive manufacture (CSAM) in conjunction with superplastic formation diffusion bonding (SPFDB), for example, by increasing thickness of a finished workpiece (e.g., a sheet of metal such as titanium, aluminum, or stainless steel) in targeted regions in order to provide structural reinforcement. By practicing one or more implementations of the disclosure, the increased thickness can be tapered at the edges, avoiding the drawbacks of step-function differences in thickness (e.g., unnecessary weight, surface irregularities, and concentration of mechanical stress forces). Additionally, the increased thickness can be tailored to structural needs, removing the constraint of incrementing final workpiece thickness profiles according to the thickness of available material sheets. Some implementations enable the fabrication of parts that are reinforced by functionally grading the workpiece with dissimilar but compatible materials, for example by using CSAM and/or diffusion bonding. The result is improved performance of parts with lower weight, and at a lower cost.

Aspects of the disclosure reduce fabrication steps, reducing cost and improving supply chain operations. For example, complex structures made with multiple parts can be unitized in a single manufacture step. For example, a finished workpiece can be a single structure with integrated stiffeners, whereas previously, stiffeners were added as separate parts or in a separate process. Stiffeners can be used, for example, in regions surrounding fasteners and other high-stress portions of the finished workpiece.

CSAM reinforcements can generate SPFDB structures with higher complexity and superior, tailored distribution of thicknesses, such as thin walls where feasible and thicker walls where needed. This permits more optimal weight and shape while still handling structural stresses. SPFDB deforms workpieces against a mold, using both temperature and pressure, which can thin areas of the workpiece. CSAM is used to apply thicker deposits in specific areas by building up a deposit reinforcement layer by layer, as a nozzle moves over the area repeatedly, with the number of passes and speed of the passes determining the thickness of the built-up deposit. Multiple different configurations are disclosed. Aspects of the disclosure can be used for multi-sheet SPFDB to form sandwich structures with internal gas pockets, for example, using four workpiece sheets to create 4-sheet sandwich structures. CSAM may be used to form pads of additive material on at least some portions inside and/or outside of the sandwich structure.

Aspects and implementations disclosed herein are directed at fabricating a finished workpiece having a shaped portion. An implementation includes: a SPFDB component; a CSAM component; and a mold having a concavity. Various configurations can operate on a workpiece with the SPFDB and CSAM components in different orders. An implementation is configured to cold spray (with the CSAM component) an additive material onto the workpiece; and perform superplastic forming (with the SPFDB component) on the workpiece with the mold, thereby rendering the workpiece into the finished workpiece having the shaped portion. The shaped portion conforms to a shape defined by the concavity in some examples. Cold spraying results in an increased thickness of the finished workpiece in a target region, which can provide structural reinforcement, and which can have a tapered edge. The workpiece can be a metal substrate made of titanium, aluminum, stainless steel, or another material.

Figure 2:
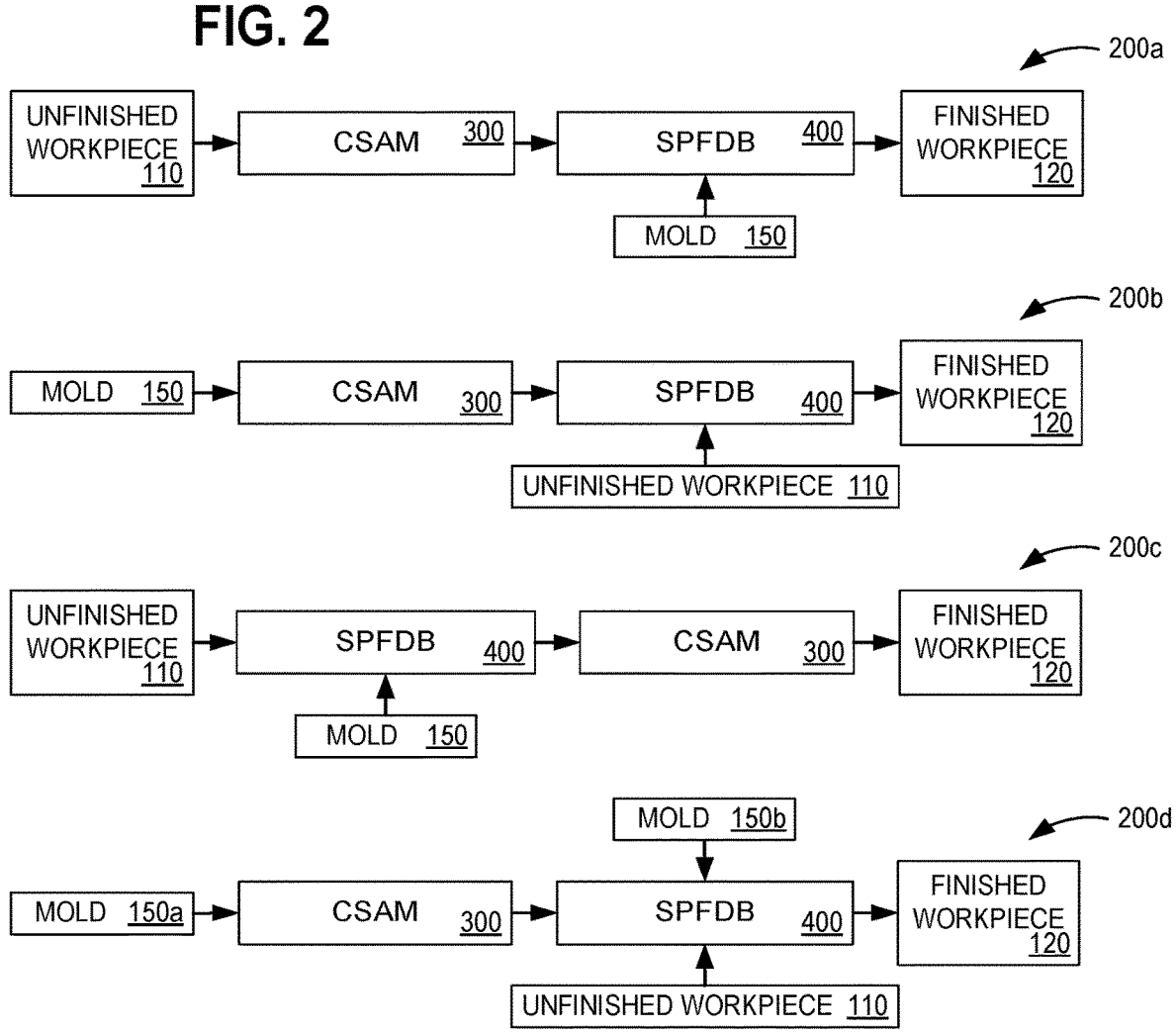
FIG. 2 illustrates various configurations of the system 100 of FIG. 1.

Referring more particularly to the drawings, FIG. 1 illustrates a system 100 for fabricating a finished workpiece 120 by performing CSAM with SPFDB. The system 100 is a generic representation, and multiple specific configuration variations are illustrated in FIG. 2. The system 100 intakes an unfinished workpiece 110, and uses a mold 150 (also spelled "mould" in some contexts), to render the unfinished workpiece 110 into a finished workpiece 120. In some implementations, the unfinished workpiece 110 comprises a metal substrate (e.g., a metal sheet) having a metal selected from the list consisting of: titanium, aluminum, and stainless steel. Both a CSAM component 300 and an SPFDB component operate on the unfinished workpiece 110. The CSAM component 300 intakes CSAM materials 301 and the SPFDB component 400 intakes SPFDB materials 401.

The CSAM component 300 cold sprays an additive material 303 (from the CSAM materials 301) onto the unfinished workpiece 110. The cold spraying of the additive material 303 results in an increased thickness of the finished workpiece 120 in a target region 124. This can provide structural reinforcement of the finished workpiece 120 in the target region 124, can provide functionally graded material, and is described in further detail in relation to FIG. 3. The SPFDB component 400 performs superplastic forming on the unfinished workpiece 110 with the mold 150, as is described in further detail in relation to FIG. 4.

Figure 5:
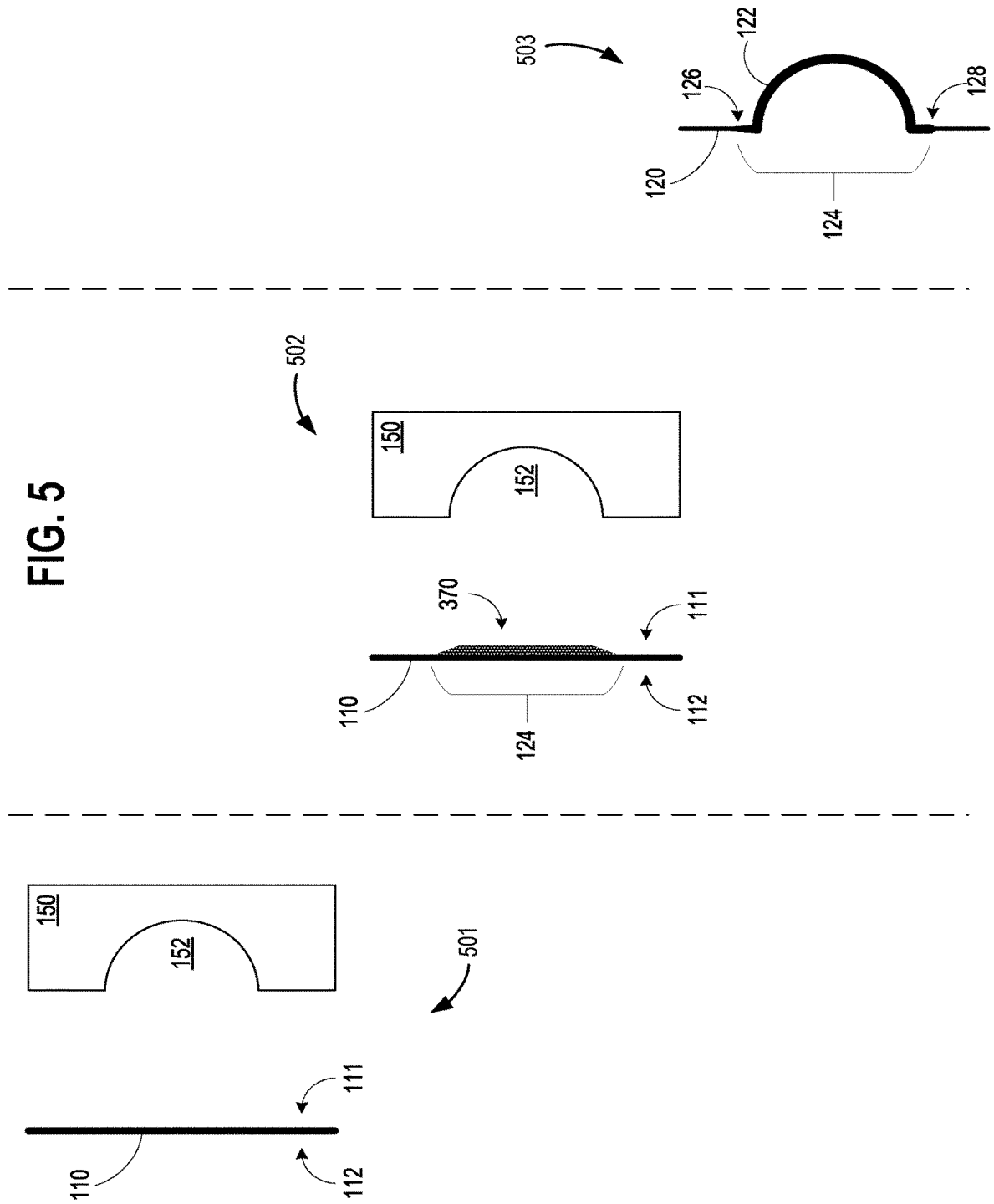
FIG. 5 illustrates stages of turning an unfinished workpiece into a finished workpiece, using a configuration of the system, as shown in FIG. 2.
Figure 7:
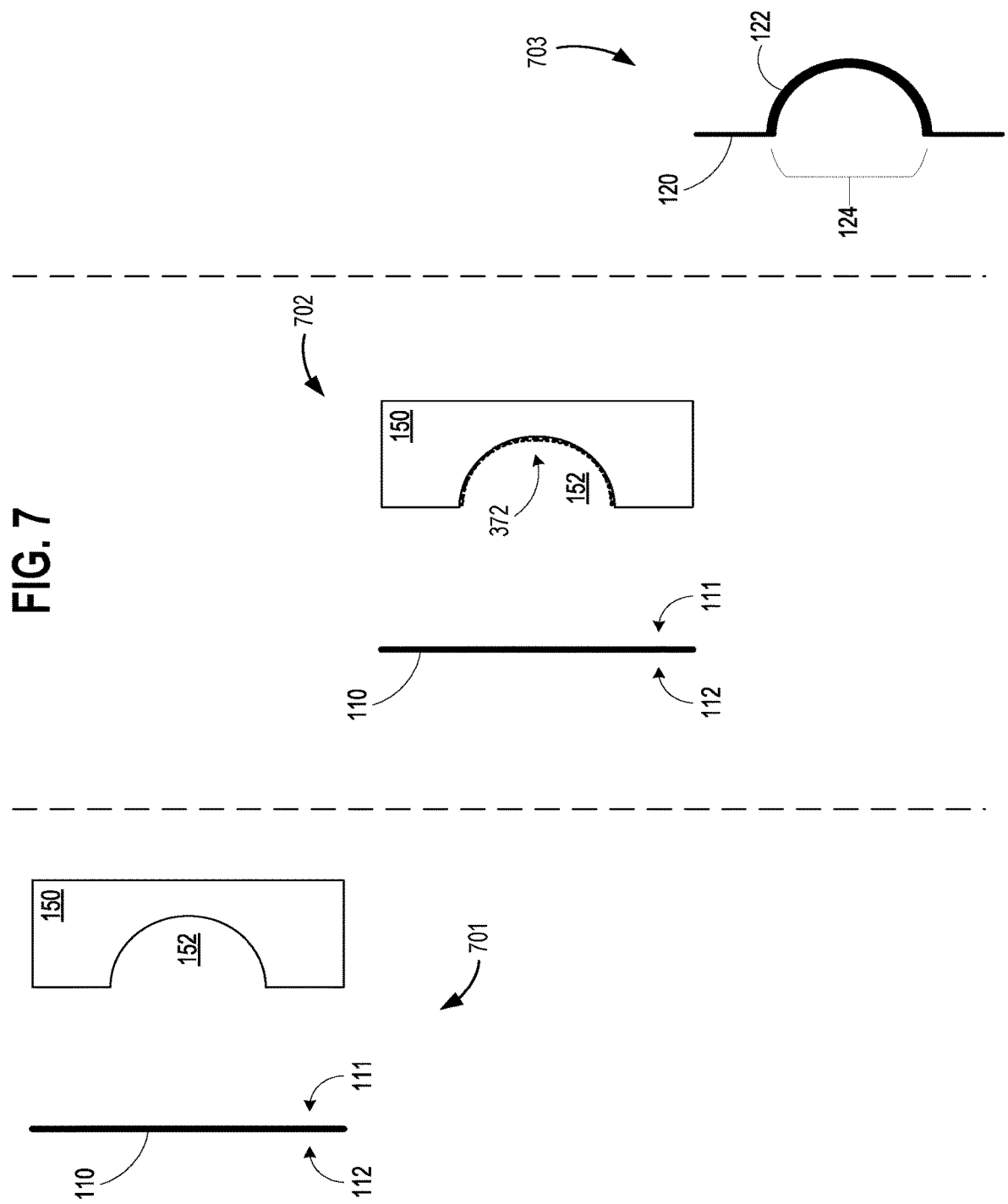
FIG. 7 illustrates stages of turning an unfinished workpiece into a finished workpiece, using another configuration of the system, as shown in FIG. 2.

Turning next to FIG. 2, various configurations 200a-200d of the system 100 are shown. For the configuration 200a, the CSAM component 300 sprays the additive material 303 onto the unfinished workpiece 110 in such a manner that when the SPFDB component 400 uses the mold 150 to form the unfinished workpiece 110 into the shape of the finished workpiece 120, the resulting finished workpiece 120 has the desired thickness profile. The stages of turning the unfinished workpiece 110 into the finished workpiece 120, using the configuration 200a, are shown in FIG. 5. For the configuration 200b, the CSAM component 300 sprays the additive material 303 onto the mold 150 and then the SPFDB component 400 uses the mold 150 to form the unfinished workpiece 110 into the shape of the finished workpiece 120, while performing diffusion bonding with the additive material 303. The resulting finished workpiece 120 has the desired thickness profile. The stages of turning the unfinished workpiece 110 into the finished workpiece 120, using the configuration 200b, are shown in FIG. 7.

Figure 9:
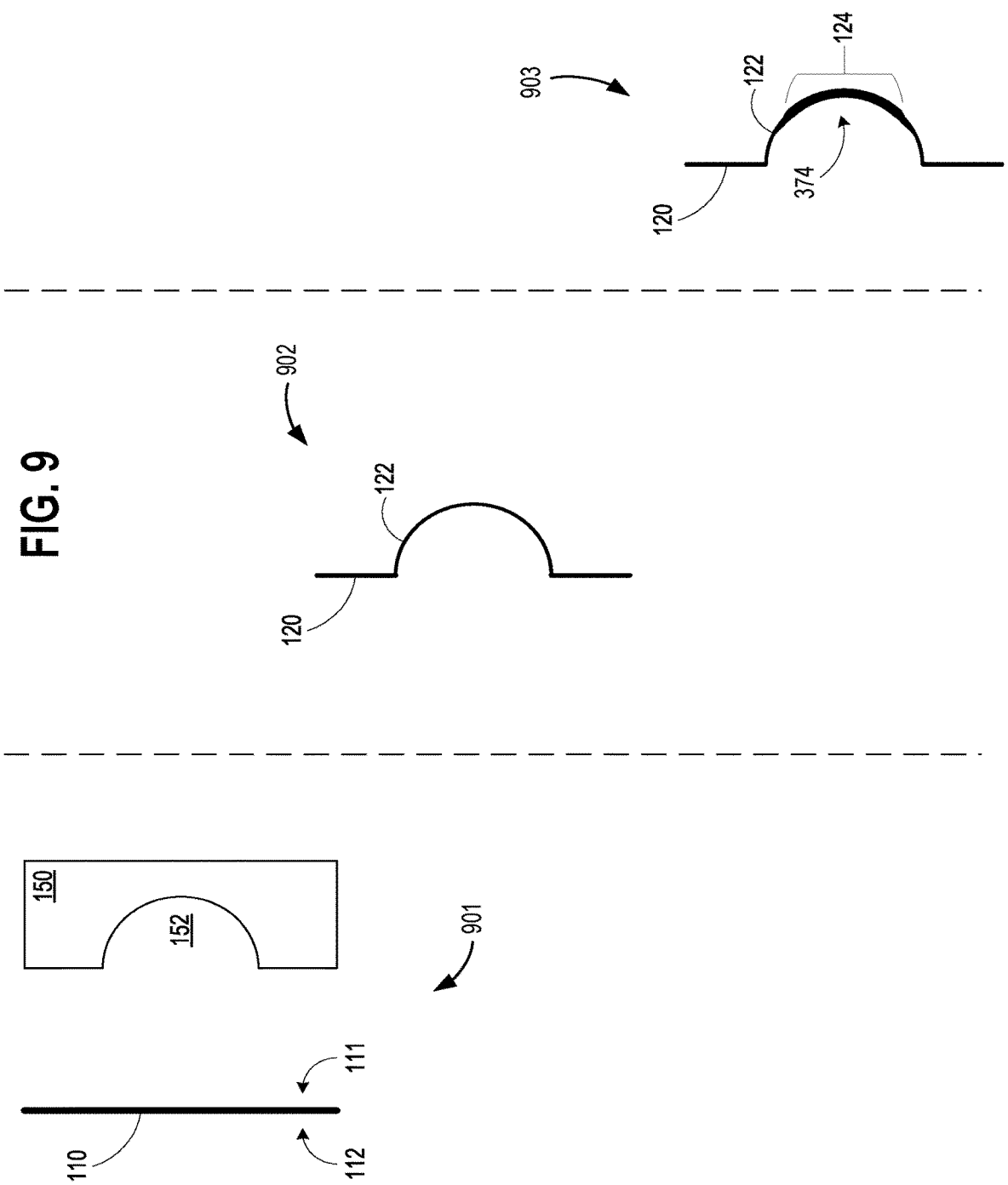
FIG. 9 illustrates stages of turning an unfinished workpiece into a finished workpiece, using another configuration of the system, as shown in FIG. 2.
Figure 11:
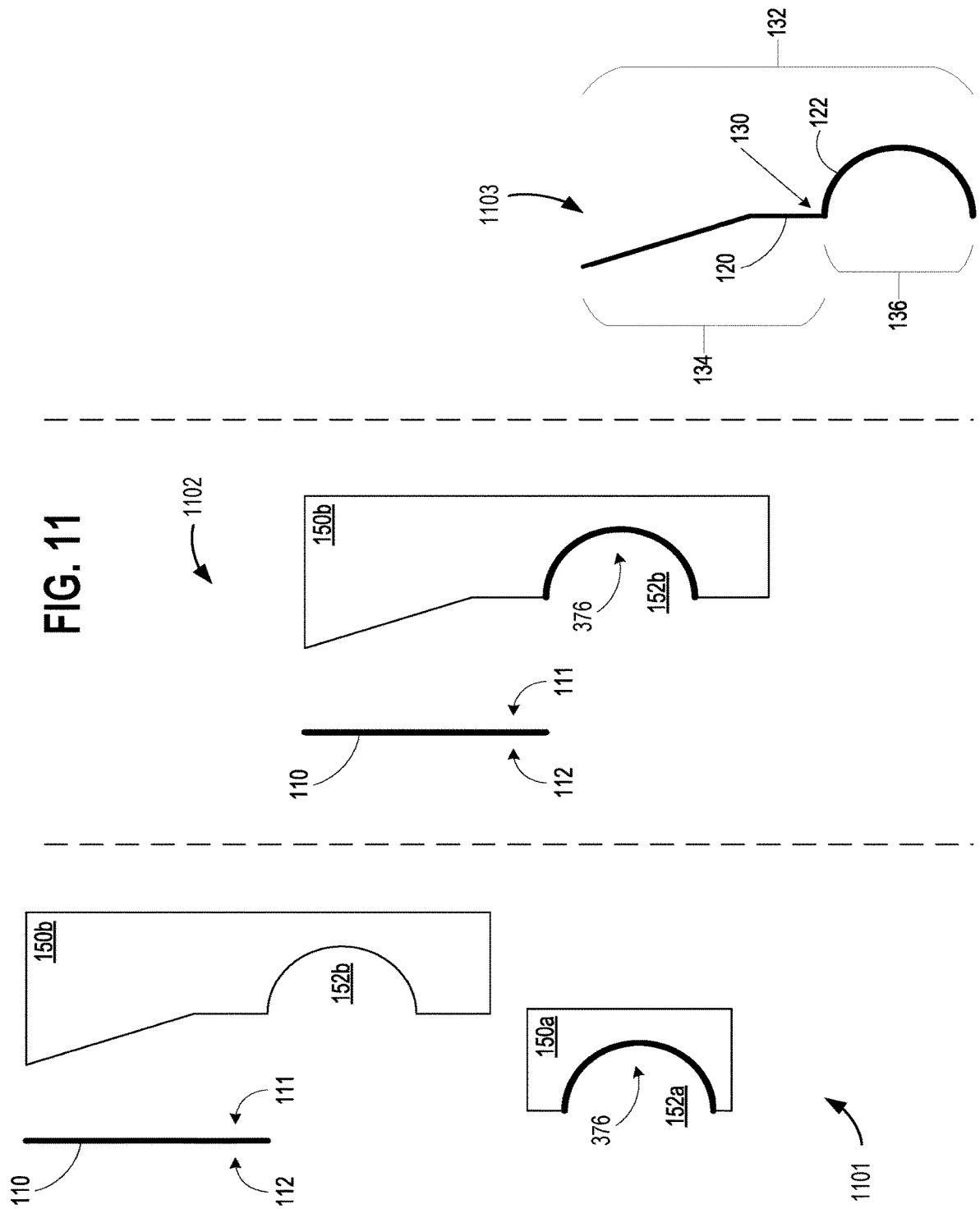
FIG. 11 illustrates stages of turning an unfinished workpiece into a finished workpiece, using another configuration of the system, as shown in FIG. 2.

For the configuration 200c, the SPFDB component 400 uses the mold 150 to form the unfinished workpiece 110 into the rough shape of the finished workpiece 120, and then the CSAM component 300 sprays the additive material 303 onto the unfinished workpiece 110 to render it into the finished workpiece 120 having the desired thickness profile. The stages of turning the unfinished workpiece 110 into the finished workpiece 120, using the configuration 200c, are shown in FIG. 9. For the configuration 200d, the CSAM component 300 sprays the additive material 303 onto a mold 150a (or the mold 150) and then the SPFDB component 400 uses a mold 150a (or the mold 150) to form the unfinished workpiece 110 into the shape of the finished workpiece 120, while diffusion bonding it to the additive material 303. The resulting finished workpiece 120 has the desired thickness profile. The stages of turning the unfinished workpiece 110 into the finished workpiece 120, using the configuration 200d are shown in FIG. 11.

Figure 3:
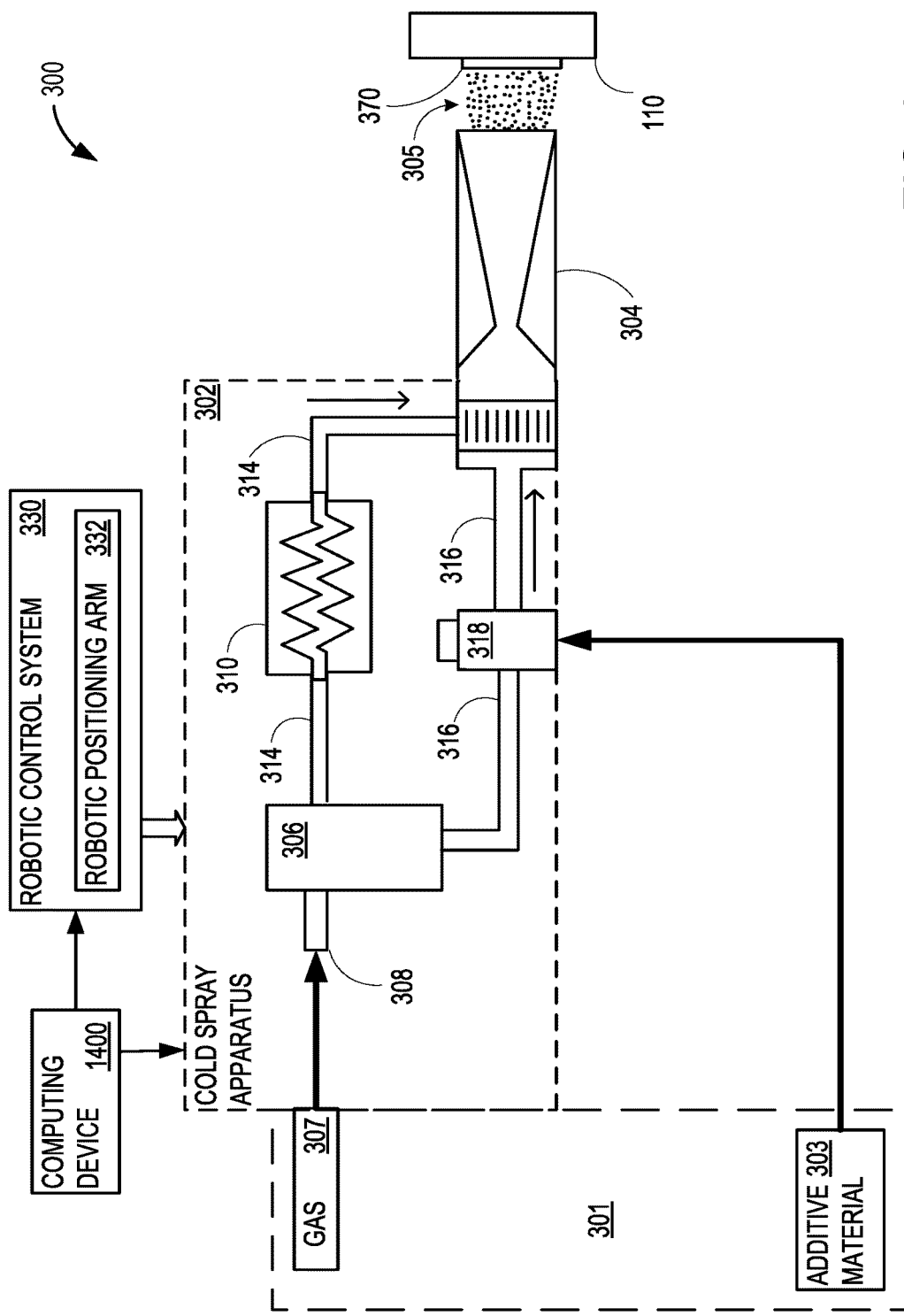
FIG. 3 illustrates an implementation of an exemplary CSAM component that can be used in the system of FIG. 1.

FIG. 3 illustrates an implementation of the CSAM component 300, which includes a cold spray apparatus 302 that can be used to cold spray the additive material 303 onto the unfinished workpiece 110 to form a deposit 370. The additive material 303 can be a powdered version of the same material as the unfinished workpiece (e.g., titanium or aluminum), or can be a different material for functional grading. A source of gas 307, such as nitrogen or helium, is connected to a gas control module 306 via an inlet 308. The CSAM materials 301 comprise the additive material 303 and the gas 307. The gas control module 306 controls the flow of the gas 307 through a first line 314 connected to a nozzle 304 and through a second line 316 connected to a powder chamber 318 and then to the nozzle 304. The gas 307 flowing through the lines 314 and 316 causes the additive material 303 located within the powder chamber 318 to be sprayed from the nozzle 314 as a particle stream 305. The particle stream 305 travels at a high velocity from the nozzle 304, which can be a supersonic nozzle in one example, and is deposited on a surface of the unfinished workpiece 110 to form the deposit 370. The particle stream 305 is sprayed at a temperature that is well below the melting point of the additive material 303. Upon impacting the unfinished workpiece 110, the particles of the particle stream 305 undergo plastic deformation due to the high velocity of the particle stream 305 and bond to each other and to the unfinished workpiece 110 to increase the thickness of the unfinished workpiece 110.

The cold spray apparatus 302 includes, in one example, a heater 310 used to heat the gas 307 to a requisite temperature prior to entrance of the gas 307 into the nozzle 304. For example, the gas 307 can be heated to between 400 degrees and 900 degrees Celsius prior to entering the nozzle 304 to spray the additive material 303 as the particle stream 305. The heater 310 is used to accelerate the speed of the particle stream 305, but the heat from the heated gas 307 is not transferred to the metallurgical bonding of the particles of the particle stream 305.

In one implementation, the additive material 303 used in the cold spray process is configured to produce a desired thickness for the unfinished workpiece 110, as would be recognized by one of ordinary skill in the art having the benefit of this disclosure. The cold spraying of the additive material 303, as opposed to thermal spraying, can permit the use of a larger amount of the additive material 303 to produce a desired thickness. The additive material 303 can be a mixture of materials to produce the structural reinforcement and other properties desired for the finished workpiece 120. For example, the additive material 303 can include nickel, cobalt, and iron powders. The use of a cold spray helps to strengthen the finished workpiece 120, reducing distortion due to thermal and mechanical stresses.

In one implementation, the CSAM component 300 includes a robotic control system 330, which controls a robotic positioning arm 332 to move the cold spray apparatus 302 relative to the unfinished workpiece 110. By moving the cold spray apparatus 302, the nozzle 304 moves relative to the unfinished workpiece 110 so that the particle stream 305 creates thinner or thicker portions of the deposit 370. For example, if the nozzle 304 dwells longer at a first location than it dwells at a second location, or passes over the first location than it passes over the second location, the deposit 370 will be thicker at the first location. In this manner, the deposit 370 can be tapered at its edges, rather than having abrupt edges (e.g., a step-function edge). In one implementation, the robotic positioning arm 332 moves the unfinished workpiece 110 rather than the cold spray apparatus 302. In one implementation, two robotic positioning arms 332 move both the unfinished workpiece 110 and the cold spray apparatus 302. In one implementation, the robotic control system 330 is controlled, at least in part, by executing instructions by one or more processors 1804 of computing device 1800 of FIG. 18. In one implementation, the robotic control system 330 includes an implementation of the computing device 1800. In one implementation, components of the cold spray apparatus 302 (e.g., the gas control module 306 and the heater 310) are controlled by an implementation of the computing device 1800.

Figure 4:
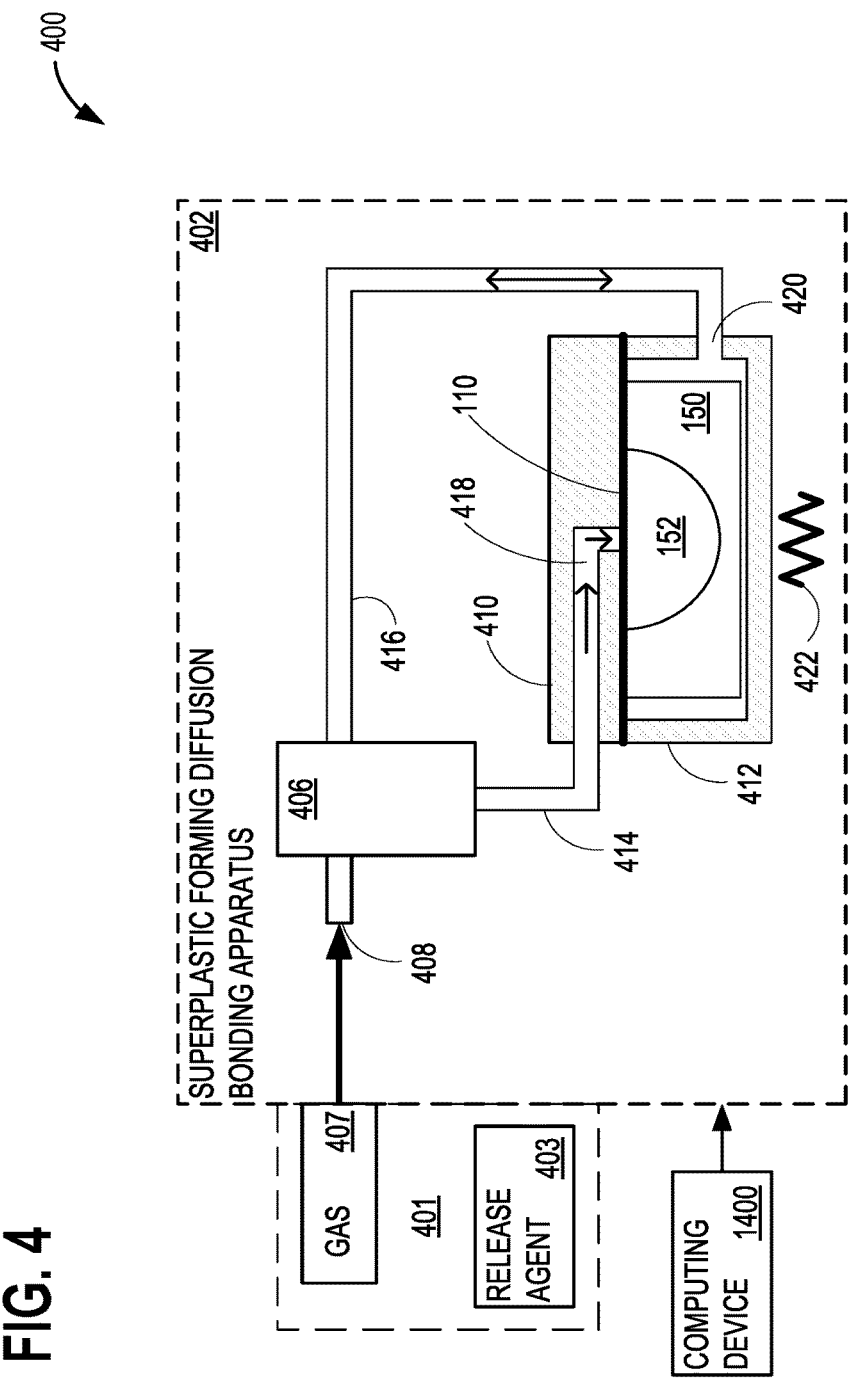
FIG. 4 illustrates an implementation of an exemplary SPFDB component that can be used in the system of FIG. 1.

FIG. 4 illustrates an implementation of the SPFDB component 400, which includes an SPFDB apparatus 402 that can be used to perform superplastic forming to shape the unfinished workpiece 110 and diffusion bonding to bond materials to the unfinished workpiece 110. Specifically, the SPFDB apparatus 402 shapes the unfinished workpiece 110 to the mold 150, which is illustrated as having a concavity 152. A lid 410 is placed onto a forming chamber 412 to clamp the unfinished workpiece 110 between the lid 410 and the forming chamber 412. The unfinished workpiece 110 is heated to superplastic temperature using a heater 422.

A source of gas 407 is connected to a gas control module 406 via an inlet 408. When the unfinished workpiece 110 has reached superplastic temperature, the gas 407, which can be dried argon, is injected under pressure through an inlet line 414 and a passage 418 in the lid 410 to pressurize the space between the underside of the lid 410 and the unfinished workpiece 110. The pressure of the gas 407 acting against the unfinished workpiece 110 deforms the unfinished workpiece 110 into the concavity 152 of the mold 150. Pressure can be displaced from the forming chamber 412 through a second gas line 416 and a passage 420 in the forming chamber 412. When the unfinished workpiece 110 has finished conforming to match the concavity 152 of the mold 150, the forming pressure of the gas 407 is relieved and the lid 410 is released and removed from the forming chamber 412. In one implementation, back pressure (e.g., using the gas 407) is applied via the second gas line 416 and the passage 420. After the metal blank 58 is fully formed against the facing surface of the die 56 as shown in FIG. 2D, the pressure in channel A is reduced back to the magnitude of the pressure in channel B and then the pressure in both channels A and B is reduced in a ramp-down schedule illustrated in Zone C of FIG. 4.

The SPFDB materials 401 comprise a release agent 403 and the gas 307. In one implementation, the release agent 404 is applied to facilitate removing the finished workpiece 120 (or the unfinished workpiece 110, depending on whether the SPFDB is the final process step) from the mold 150. In one implementation, the SPFDB component 400 includes an implementation of the computing device 1800 that controls components of the SPFDB apparatus 402 (e.g., the gas control module 406 and the heater 422).

FIG. 5 illustrates stages 501-503 of turning the unfinished workpiece 110 into the finished workpiece 120, using a configuration 200a of the system 100, as shown in FIG. 2. The unfinished workpiece 110 has a facing side 111, which is placed against the mold 150, and a back side 112. The mold 150 has a concavity 152. Although only a two-dimensional (2D) profile is illustrated, it should be understood that the concavity 152 in the mold 150 can be doubly curved, that is curved in orthogonal dimensions. For example, the concavity 152, illustrated in 2D, is a semi-circle, in three dimensions (3D), the concavity can be hemispherical. At stage 501, the unfinished workpiece 110 has not yet been conformed to match the concavity 152 of the mold 150, nor has the unfinished workpiece 110 been subjected to cold spraying.

At stage 502, the additive material 303 is cold sprayed onto the unfinished workpiece 110, forming the deposit 370, in the target region 124. It should be understood that the deposit 370 can be on either or both of the facing side 111 and the back side 112 of the unfinished workpiece 110. As illustrated, the target region 124 spans the portion of the unfinished workpiece 110 that will be conformed to the concavity 152 of the mold 150. At stage 503, the unfinished workpiece 110 has been reshaped by superplastic forming, and has been rendered into the finished workpiece 120 having the shaped portion 122. As illustrated, the target region 124 spans the entirety of the shaped portion 122, although it should be understood that this is only for the purpose of illustration. In some embodiments, at least a portion of the target region 124 overlaps with at least a portion of the shaped portion 122, such that the shaped portion 122 can contain the entirety of the target region 124 and extend further beyond the target region 124, the target region 124 can span the entirety of the shaped portion 122 and extend further beyond the shaped portion 122, and the target region 124 and the shaped portion 122 can partially overlap.

In one implementation, the increased thickness left by the deposit 370 provides structural reinforcement of the finished workpiece 120 in the target region 124. Also, as shown, the increased thickness of the finished workpiece 120 in the target region 124 is tapered at an edge 126 of the target region 124. For illustrative purposes, an abrupt edge 128, producing a step function in the thickness of the finished workpiece 120, is also illustrated. In one implementation, the system 100 has the advantageous ability to avoid abrupt edges and produce tapered edges, which is preferable in some scenarios.

Figure 6:
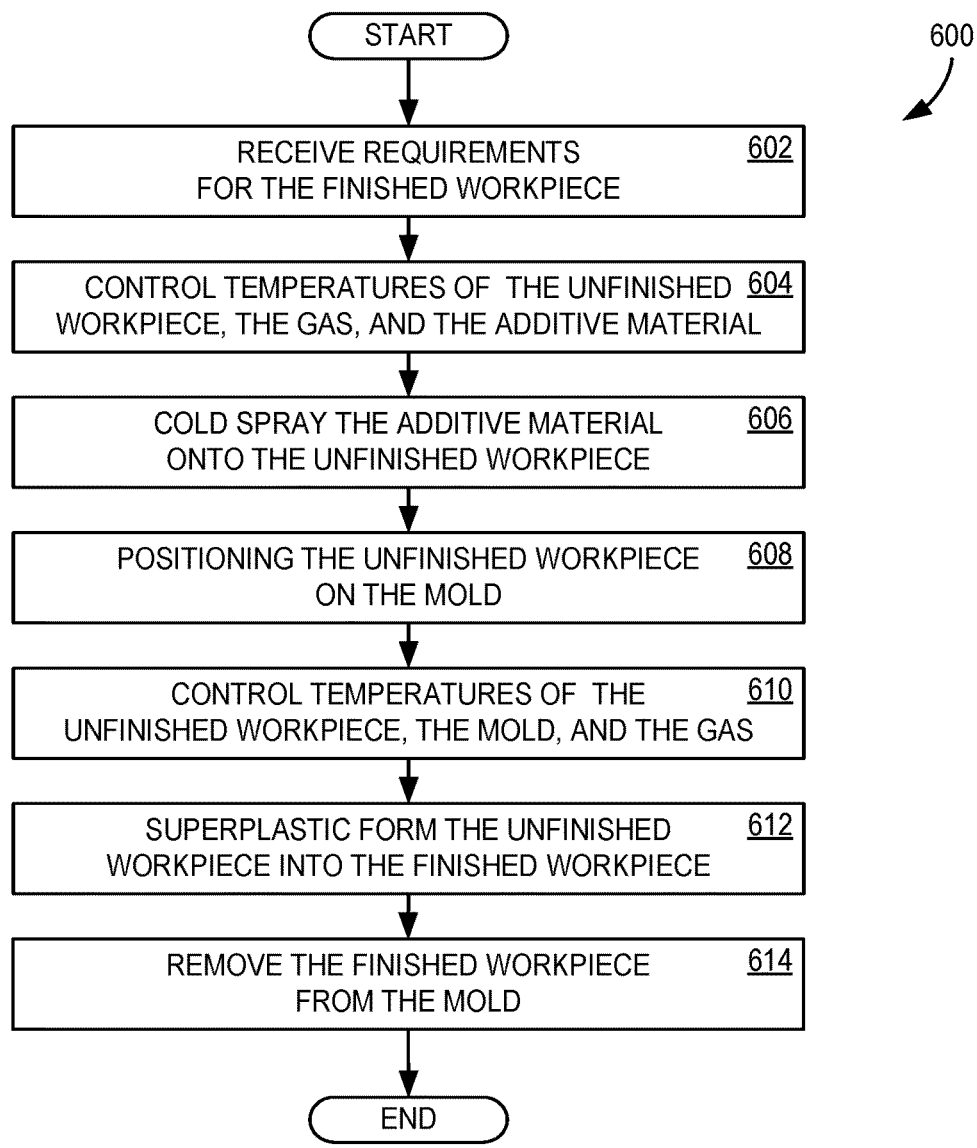
FIG. 6 is a flowchart illustrating a method of fabricating a finished workpiece, as shown in the stages of FIG. 5, using a configuration illustrated in FIG. 2.

FIG. 6 is a flowchart 600 illustrating a method of fabricating the finished workpiece 120, as shown in the stages 501-503 of FIG. 5, using the configuration 200a of FIG. 2. Operation 602 includes receiving requirements for the finished workpiece 120, for example the shape and thickness profile and the material to use for the additive material 303. Operation 604 includes controlling temperature of the unfinished workpiece 110, the gas 307, and the additive material 303. In one implementation, the unfinished workpiece 110 comprises a metal substrate having a metal selected from the list consisting of: titanium, aluminum, and stainless steel.

Operation 606 includes cold spraying the additive material 303 onto the unfinished workpiece 110. In one implementation, the cold spraying uses a helium or nitrogen gas. Operation 608 includes positioning the unfinished workpiece 110 on the mold 150 having the concavity 152. Operation 610 includes controlling temperatures of the unfinished workpiece 110, the mold 150, and the gas 407. Operation 612 includes superplastic forming the unfinished workpiece 110 into the finished workpiece 120 having the shaped portion 122, the shaped portion 122 conforming to a shape defined by the concavity 152. Operation 614 includes removing the finished workpiece 120 from the mold 150. In one implementation, removing the finished workpiece 120 from the mold 150 comprises using the release agent 403 to remove the finished workpiece 120 from the mold 150. In one implementation, removing the finished workpiece 120 from the mold 150 comprises using a backpressure, for example via the second gas line 416 and the passage 420.

The cold spraying of the additive material 303 in operation 606 has resulted in an increased thickness of the finished workpiece 120 in the target region 124. In one implementation, at least a portion of the target region 124 overlaps with at least a portion of the shaped portion 122. In one implementation, the increased thickness of the finished workpiece 120 in the target region 124 is tapered at the edge 126 of the target region 124. In one implementation, the shaped portion 122 is doubly curved. In one implementation, the increased thickness provides structural reinforcement of the finished workpiece 120 in the target region 124.

FIG. 7 illustrates stages 701-703 of turning the unfinished workpiece 110 into the finished workpiece 120, using the configuration 200b of the system 100, as shown in FIG. 2. At stage 701, the unfinished workpiece 110 has not yet been conformed to match the concavity 152 of the mold 150, nor has the unfinished workpiece 110 been subjected to cold spraying. At stage 702, the additive material 303 is cold sprayed onto the mold 150, within the concavity 152, forming a deposit 372. At stage 703, the unfinished workpiece 110 is been reshaped by superplastic forming, and is thus rendered into the finished workpiece 120 having the shaped portion 122. As illustrated, the target region 124 spans the portion of the shaped portion 122 that corresponds to the location of the deposit 372. The additive material 303 of the deposit 372 has been diffusively bonded to the unfinished workpiece 110 (now the finished workpiece 120). The location, thickness, and edges of the target region 124 can be controlled as described previously.

Figure 8:
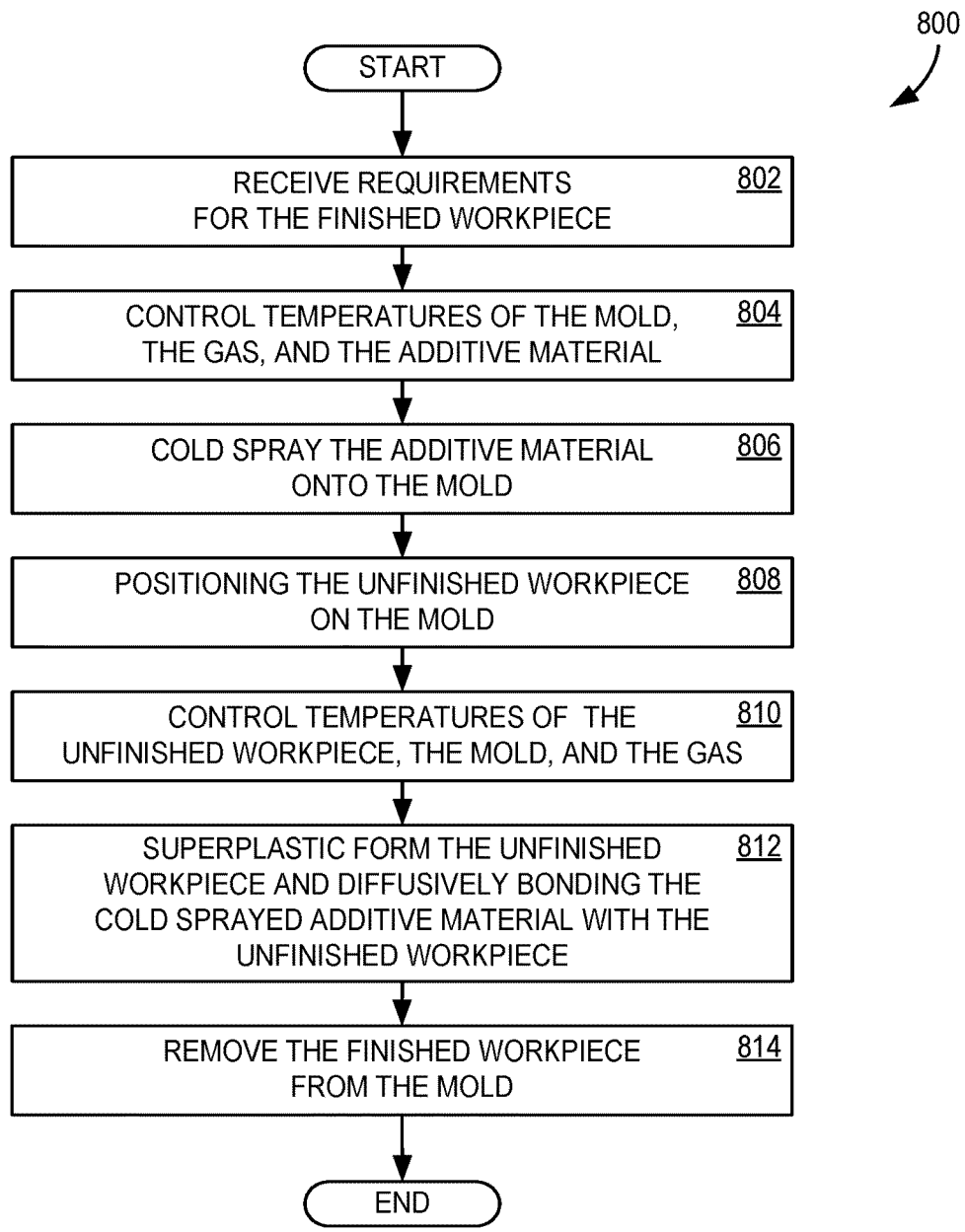
FIG. 8 is a flowchart illustrating a method of fabricating a finished workpiece, as shown in the stages of FIG. 7, using a configuration of the system, illustrated in FIG. 2.

FIG. 8 is a flowchart 800 illustrating a method of fabricating the finished workpiece 120, as shown in the stages 701-703 of FIG. 7, using the configuration 200b of FIG. 2. Operation 802 includes receiving requirements for the finished workpiece 120, for example the shape and thickness profile and the material to use for the additive material 303. Operation 804 includes controlling temperature of the mold 150, the gas 307, and the additive material 303. Operation 806 includes cold spraying the additive material 303 onto the mold 150 having the concavity 152. In one implementation, the cold spraying uses a helium or nitrogen gas.

Operation 808 includes positioning the unfinished workpiece 110 on the mold 150. In one implementation, the unfinished workpiece 110 comprises a metal substrate having a metal selected from the list consisting of: titanium, aluminum, and stainless steel. Operation 810 includes controlling temperatures of the unfinished workpiece 110, the mold 150, the deposit 372, and the gas 407. Operation 812 includes superplastic forming the unfinished workpiece 110 and diffusively bonding the cold sprayed additive material 303 (as the deposit 372) with the unfinished workpiece 110, thereby rendering the unfinished workpiece 110 into the finished workpiece 120 having the shaped portion 122, the shaped portion 122 conforming to a shape defined by the concavity 152. Operation 814 includes removing the finished workpiece 120 from the mold 150. In one implementation, removing the finished workpiece 120 from the mold 150 comprises using the release agent 403 to remove the finished workpiece 120 from the mold 150. In one implementation, removing the finished workpiece 120 from the mold 150 comprises using a backpressure, for example via the second gas line 416 and the passage 420.

The cold spraying of the additive material 303 in operation 806 results in an increased thickness of the finished workpiece 120 in the target region 124. In one implementation, at least a portion of the target region 124 overlaps with at least a portion of the shaped portion 122. In one implementation, the increased thickness of the finished workpiece 120 in the target region 124 is tapered at the edge 126 of the target region 124. In one implementation, the shaped portion 122 is doubly curved. In one implementation, the increased thickness provides structural reinforcement of the finished workpiece 120 in the target region 124.

FIG. 9 illustrates stages of turning the unfinished workpiece 110 into the finished workpiece 120, using the configuration 200c of the system 100, as shown in FIG. 2. At stage 901, the unfinished workpiece 110 has not yet been conformed to match the concavity 152 of the mold 150, nor has the unfinished workpiece 110 been subjected to cold spraying. At stage 902, the unfinished workpiece 110 is reshaped by superplastic forming, to conform to the mold 150 and has the shaped portion 122. At stage 903, the additive material 303 is cold sprayed onto the unfinished workpiece 110, either on the convex or concave side, or both. The cold spraying renders the unfinished workpiece 110 into the finished workpiece 120. The location, thickness, and edges of the target region 124 can be controlled as described previously.

Figure 10:
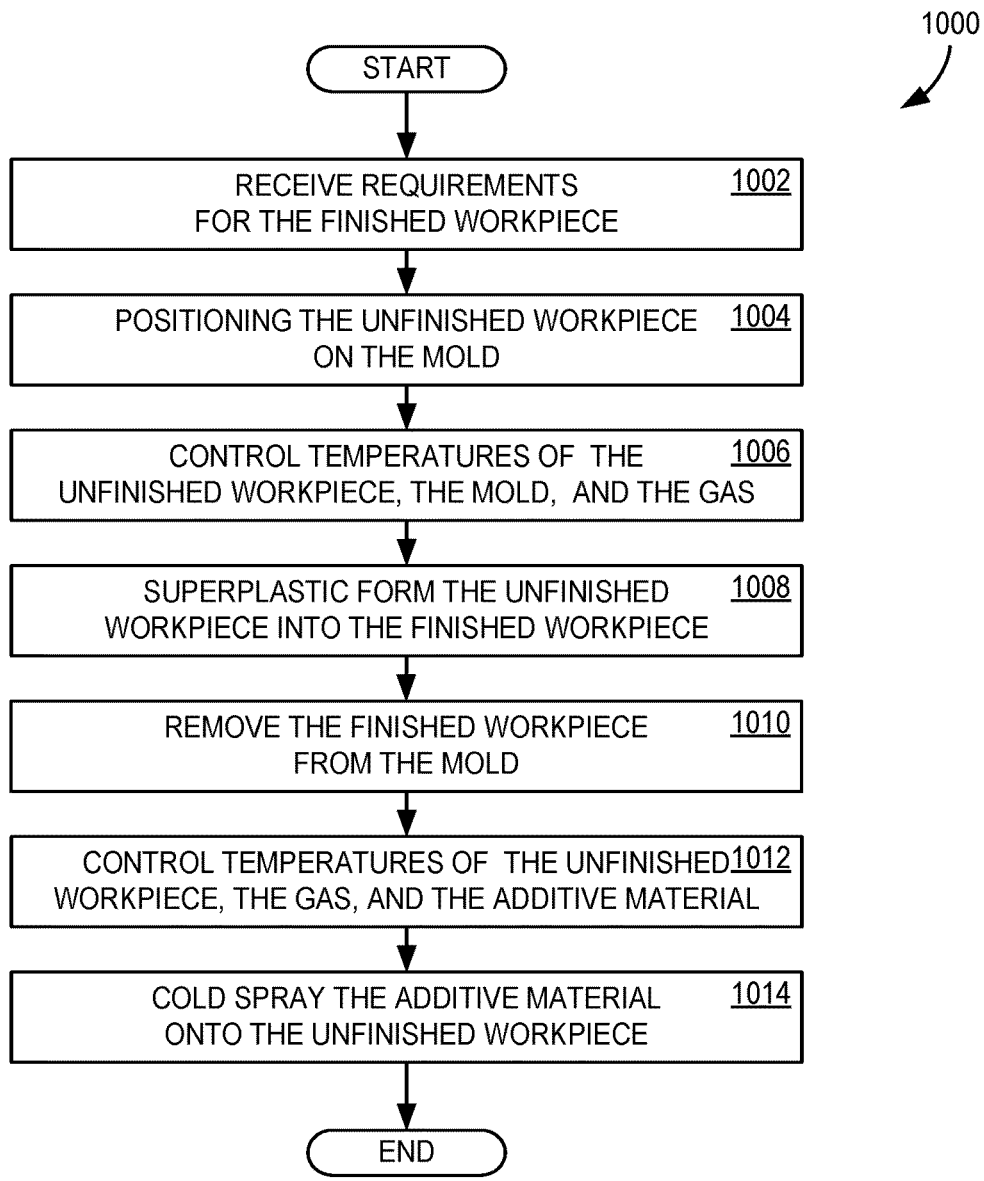
FIG. 10 is a flowchart illustrating a method of fabricating a finished workpiece, as shown in the stages of FIG. 9, using a configuration of the system, illustrated in FIG. 2.

FIG. 10 is a flowchart 1000 illustrating a method of fabricating the finished workpiece 120, as shown in the stages 901-903 of FIG. 9, using the configuration 200c of FIG. 2. Operation 1002 includes receiving requirements for the finished workpiece 120, for example the shape and thickness profile and the material to use for the additive material 303. Operation 1004 includes positioning the unfinished workpiece 110 on the mold 150 having the concavity 152. In one implementation, the unfinished workpiece 110 comprises a metal substrate having a metal selected from the list consisting of: titanium, aluminum, and stainless steel. Operation 1006 includes controlling temperatures of the unfinished workpiece 110, the mold 150, and the gas 407.

Operation 1008 includes superplastic forming the unfinished workpiece 110 into the finished workpiece 120 having the shaped portion 122, the shaped portion 122 conforming to a shape defined by the concavity 152. Operation 1010 includes removing the unfinished workpiece 110 from the mold 150. In one implementation, removing the unfinished workpiece 110 from the mold 150 comprises using the release agent 403 to remove the unfinished workpiece 110 from the mold 150. In one implementation, removing the unfinished workpiece 110 from the mold 150 comprises using a backpressure, for example via the second gas line 416 and the passage 420.

Operation 1012 includes controlling temperature of the unfinished workpiece 110, the gas 307, and the additive material 303. Operation 1014 includes cold spraying the additive material 303 onto the unfinished workpiece 110. In one implementation, the cold spraying uses a helium or nitrogen gas. The cold spraying of the additive material 303 in operation 1014 results in an increased thickness of the finished workpiece 120 in the target region 124. In one implementation, at least a portion of the target region 124 overlaps with at least a portion of the shaped portion 122. In one implementation, the increased thickness of the finished workpiece 120 in the target region 124 is tapered at the edge 126 of the target region 124. In one implementation, the shaped portion 122 is doubly curved. In one implementation, the increased thickness provides structural reinforcement of the finished workpiece 120 in the target region 124.

FIG. 11 illustrates stages of turning the unfinished workpiece 110 into the finished workpiece 120, using the configuration 200d of the system 100, as shown in FIG. 2. At stage 1101, the unfinished workpiece 110 has not yet been subjected to cold spraying or superplastic forming. A mold 150a is shown, having a concavity 152a. The additive material 303 is cold sprayed onto the mold 150a, within the concavity 152, forming a deposit 376, although the mold 150 can instead be used for this purpose. Additionally, a mold 150b is shown, having a concavity 152b, which will be used for forming the unfinished workpiece 110, although mold 150 can instead be used for this purpose also.

At stage 1102, the deposit 376 (comprising the additive material 303) is transferred from the mold 150a to the mold 150b. In one implementation, the concavity 152a is shaped sufficiently similarly to the concavity 152b, forming a deposit 372. In one implementation, the additive material 303 is cold sprayed onto the mold 150b directly, rather than first being sprayed onto the mold 150a and then being moved. In one implementation, mold 150 is used, rather than the molds 150a and 150b. At stage 1103, the unfinished workpiece 110 is reshaped by superplastic forming, and is diffusively bonded to the deposit 376 at point 130. This renders the unfinished workpiece 110 into the finished workpiece 120 having the shaped portion 122 (which, in this scenario, is formerly the deposit 376). This results in an extended length 132 of the finished workpiece 120 relative to a length 134 of the unfinished workpiece 110, by a length 136 provided by the deposit 376. The location, thickness, and edges of the target region 124 can be controlled as described previously.

Figure 12:
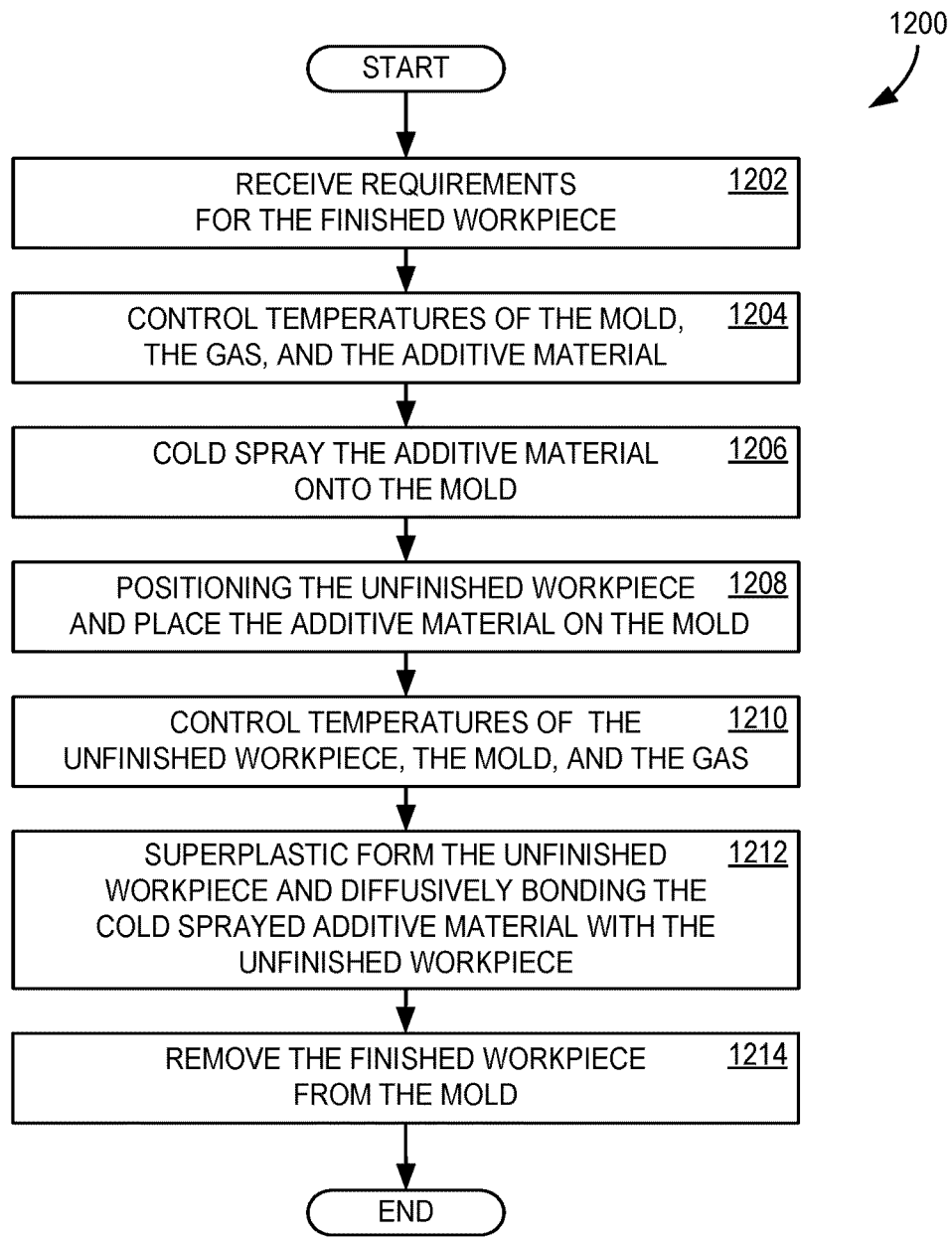
FIG. 12 is a flowchart illustrating a method of fabricating a finished workpiece, as shown in the stages FIG. 11, using the configuration of the system, illustrated in FIG. 2.

FIG. 12 is a flowchart 1200 illustrating a method of fabricating the finished workpiece 120, as shown in the stages 1101-1103 of FIG. 11, using the configuration 200d of FIG. 2. Operation 1202 includes receiving requirements for the finished workpiece 120, for example the shape and thickness profile and the material to use for the additive material 303. Operation 1204 includes controlling temperature of the mold 150a, the gas 307, and the additive material 303. Operation 1206 includes cold spraying the additive material 303 onto the mold 150a having the concavity 152a. In one implementation, the cold spraying uses a helium or nitrogen gas.

Operation 1208 includes positioning the unfinished workpiece 110 on the mold 150b and placing the cold sprayed additive material 303 (e.g., the deposit 376) on the mold 150b. In one implementation, placing the cold sprayed additive material 303 onto the mold 150b comprises placing the cold sprayed additive material 303 into the concavity 152b. In one implementation, placing the cold sprayed additive material 303 onto the mold 150b comprises cold spraying the additive material 303 onto the mold 150b (rather than the mold 150a). In one implementation, the unfinished workpiece 110 comprises a metal substrate having a metal selected from the list consisting of: titanium, aluminum, and stainless steel.

Operation 1210 includes controlling temperatures of the unfinished workpiece 110, the mold 150, the deposit 372, and the gas 407. Operation 1212 includes superplastic forming the unfinished workpiece 110 and diffusively bonding the cold sprayed additive material 303 (as the deposit 376) with the unfinished workpiece 110, thereby rendering the unfinished workpiece 110 into the finished workpiece 120 having the shaped portion 122, the shaped portion 122 conforming to a shape defined by the concavity 152. Operation 1214 includes removing the finished workpiece 120 from the mold 150. In one implementation, removing the finished workpiece 120 from the mold comprises 150 using the release agent 403 to remove the finished workpiece 120 from the mold 150. In one implementation, removing the finished workpiece 120 from the mold 150 comprises using a backpressure, for example via the second gas line 416 and the passage 420.

The cold spraying of the additive material 303 in operation 1206 results in an extended length 132 of the finished workpiece 120 relative to the length 134 of the unfinished workpiece. In one implementation, the cold sprayed additive material 303 (e.g., the deposit 376) is tapered at its edge. In one implementation, the shaped portion 122 is doubly curved. In one implementation, the increased thickness provides structural reinforcement of the finished workpiece 120 in the target region 124.

Figure 13:
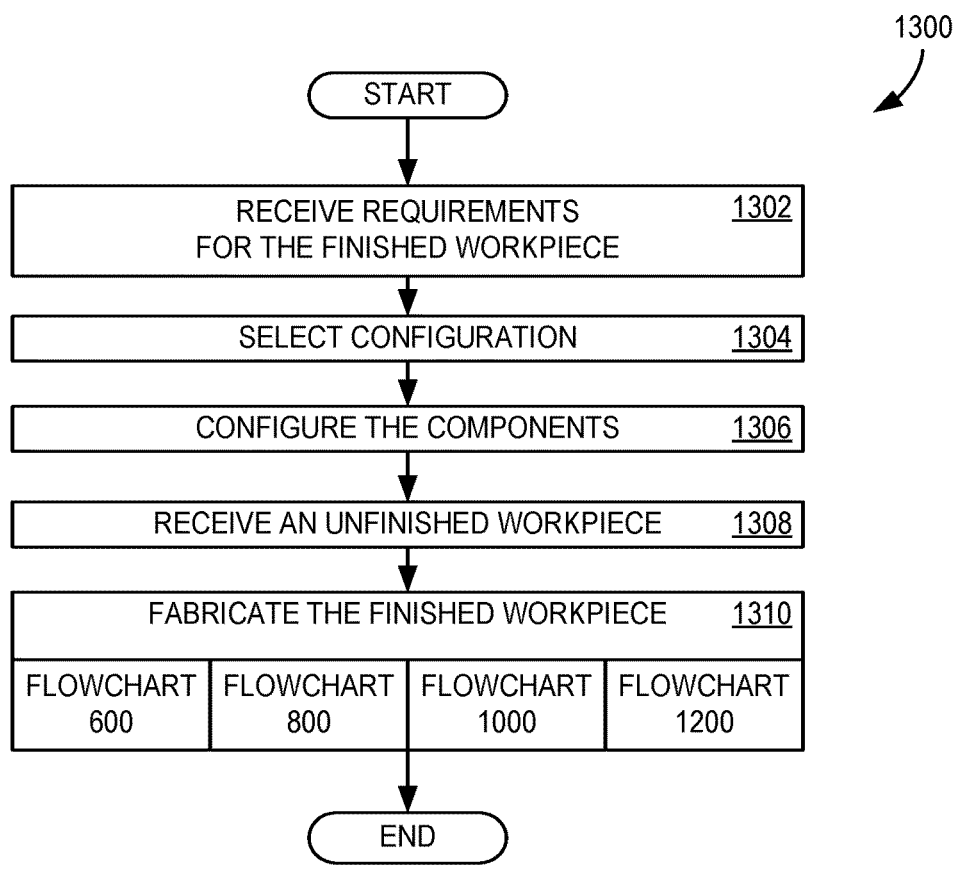
FIG. 13 is a flowchart illustrating another method of fabricating a finished workpiece.

FIG. 13 is a flowchart 1300 illustrating another method of fabricating the finished workpiece 120. In one implementation, operation 1302 includes receiving requirements for the finished workpiece 120, for example the shape and thickness profile and the material to use for the additive material 303. The specific configuration, for example, one of the configurations 200a-200d of the system 100 is selected in operation 1304. In operation 1306, components of the system 100, for example the CSAM component 300 and the SPFDB component 400, are configured according to the selection made in operation 1304. The unfinished workpiece 110 is received in operation 1308. The appropriate one of flowcharts 600, 800, 1000, and 1200 is performed to fabricate the finished workpiece 120 (e.g., rendering the unfinished workpiece 110 into the finished workpiece 120), as operation 1308.

Having thus described the various operations for the various configurations 200a-200d, and referring again to FIG. 1, the system 100 is a system for fabricating the finished workpiece 120 having the shaped portion 122, the system 100 comprising: the SPFDB component 400; the CSAM component 300; and the mold 150 having the concavity 152; wherein the system 100 is configured to: intake the unfinished workpiece 110; cold spray, with the CSAM component 300, the additive material 303 onto the unfinished workpiece 110; and perform superplastic forming, with the SPFDB component 400, on the unfinished workpiece 110 with the mold 150, thereby rendering the unfinished workpiece 110 into the finished workpiece 120 having the shaped portion 122, the shaped portion 122 conforming to a shape defined by the concavity 152. In one implementation, the unfinished workpiece 110 comprises a metal substrate having a metal selected from the list consisting of: titanium, aluminum, and stainless steel. In one implementation, the cold spraying of the additive material 303 results in an increased thickness of the finished workpiece 120 in the target region 124. In one implementation, at least a portion of the target region 124 overlaps with at least a portion of the shaped portion 122. In one implementation, the increased thickness provides structural reinforcement of the finished workpiece 120 in the target region 124. In one implementation, the increased thickness of the finished workpiece 120 in the target region 124 is tapered at an edge 128 of the target region 124. In one implementation, the shaped portion 122 is doubly curved. In one implementation, the cold spraying uses a helium or nitrogen gas. In one implementation, removing the finished workpiece 120 from the mold 150 comprises using the release agent 403 to remove the finished workpiece 120 from the mold 150.

Figure 14:
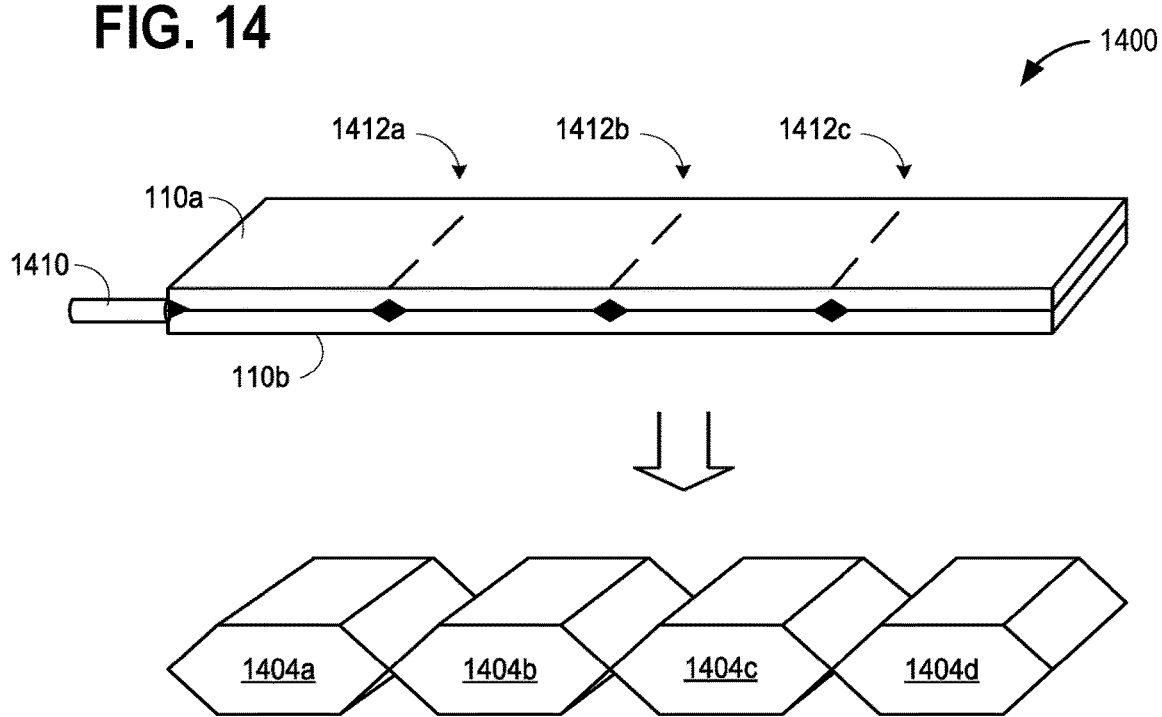
FIG. 14 illustrates an arrangement for multi-sheet SPFDB to form a sandwich structure with internal pockets.

FIG. 14 illustrates an arrangement 1400 for multi-sheet SPFDB to form a sandwich structure 1402 with internal pockets 1404a-1404d. Two workpieces, workpiece 110a and workpiece 110b, are joined with seams 1412a, 1412b, and 1412c. A gas line 1410 provides pressure to inflate the internal pockets 1404a-1404d, thereby producing the sandwich structure 1402. In some implementations, argon is used to minimize oxidation of the workpieces 110a and 110b, or other unfavorable interactions that may occur at the temperatures needed for superplastic forming of the workpieces 110a and 110b into the sandwich structure 1402.

Figure 15:
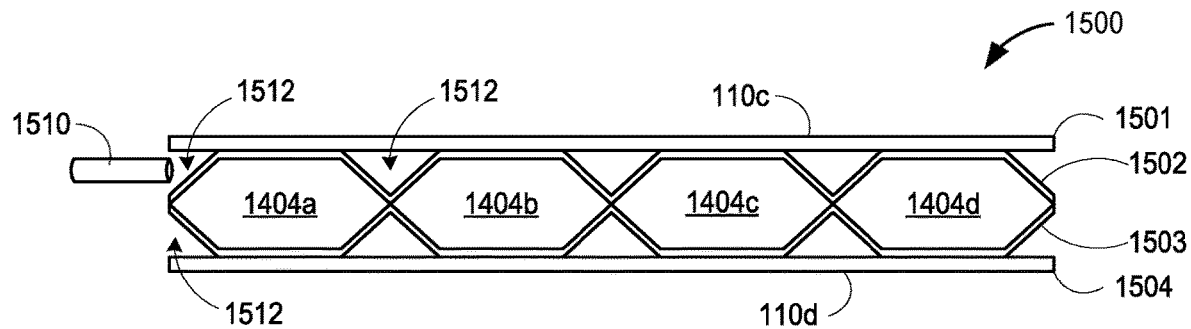
FIG. 15 illustrates a 4-sheet sandwich structure.

FIG. 15 illustrates a 4-sheet sandwich structure 1500 that uses the sandwich structure 1402 as a core. The sandwich structure 1500 has a face layer 1501 (made from a workpiece 110c), a first core layer 1502 (made from the workpiece 110a of FIG. 14), a second core layer 1503 (made from the workpiece 110b of FIG. 14), and a second face layer 1504 (made from a workpiece 110d). The sandwich structure 1500 may provide enhanced structural strength and noise reduction over a flat piece (without the internal pockets 1404a-1404d) made with the same four sheets of material. In some implementations, a second gas line 1510 is provided during the SPFDB process to inflate areas 1512 between the core layers 1502 and 1503 and the face layers 1501 and 1504.

Figure 16:
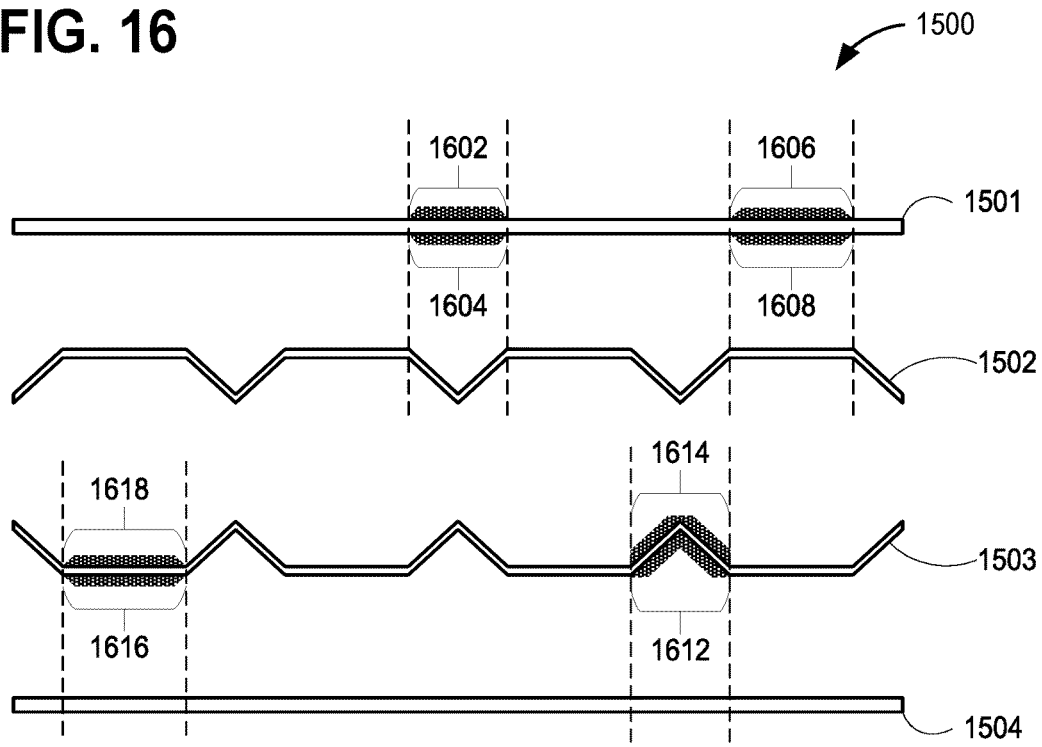
FIG. 16 illustrates options for using CSAM to form pads of additive material on at least some portions inside and/or outside of a sandwich structure.

FIG. 16 illustrates options for using CSAM to form pads of additive material 1602-1618 on at least some portions inside and/or outside of the sandwich structure 1500. The increased thickness of the additive material (e.g., the pads of additive material 1602-1618) provides structural reinforcement of the sandwich structure 1500. For example, the pad of additive material 1602 is on the outside of the face layer 1501 over at least a portion of where there is a pocket (gap) between the face layer 1501 and the core layer 1502. This may be repeated for locations of other pockets. The pad of additive material 1604 is on the inside of the face layer 1501 over at least a portion of where there is a pocket between the face layer 1501 and the core layer 1502. This may be repeated for locations of other pockets. The pad of additive material 1606 is on the outside of the face layer 1501 over at least a portion of where there is a diffusion bond between the face layer 1501 and the core layer 1502. This may be repeated for other diffusion bond locations. The pad of additive material 1608 is on the inside of the face layer 1501 over at least a portion of where there is a diffusion bond between the face layer 1501 and the core layer 1502. This may be repeated for other diffusion bond locations. The pad locations thus described for the face layer 1501 may be replicated in equivalent locations for the face layer 1504 (relative to the core layer 1503).

The pad of additive material 1612 is on the outside (relative to the sandwich structure 1402) of the core layer 1503 over at least a portion of where there is a pocket between the face layer 1504 and the core layer 1503. This may be repeated for locations of other pockets. The pad of additive material 1614 is on the inside (relative to the sandwich structure 1402) of the core layer 1503 over at least a portion of where there is a pocket between the face layer 1504 and the core layer 1503. This may be repeated for locations of other pockets. The pad of additive material 1616 is on the outside of the core layer 1503 over at least a portion of where there is a diffusion bond between the face layer 1504 and the core layer 1503. This may be repeated for other diffusion bond locations. The pad of additive material 1618 is on the inside of the core layer 1503 over at least a portion of where there is a diffusion bond between the face layer 1504 and the core layer 1503. This may be repeated for other diffusion bond locations. The pad locations thus described for the face layer 1504 may be replicated in equivalent locations for the face layer 1501 (relative to the core layer 1502). Some pad locations may provide preferable performance over other pad locations. Further, the pads of additive material 1602-1618 may be wider or narrower than shown, relative to other features shown in the sandwich structure 1500. The pads of additive material 1602-1618 represent all of the pads that may be replicated on the sandwich structure 1500 in corresponding locations relative to pockets and diffusion bonding locations.

Figure 17:
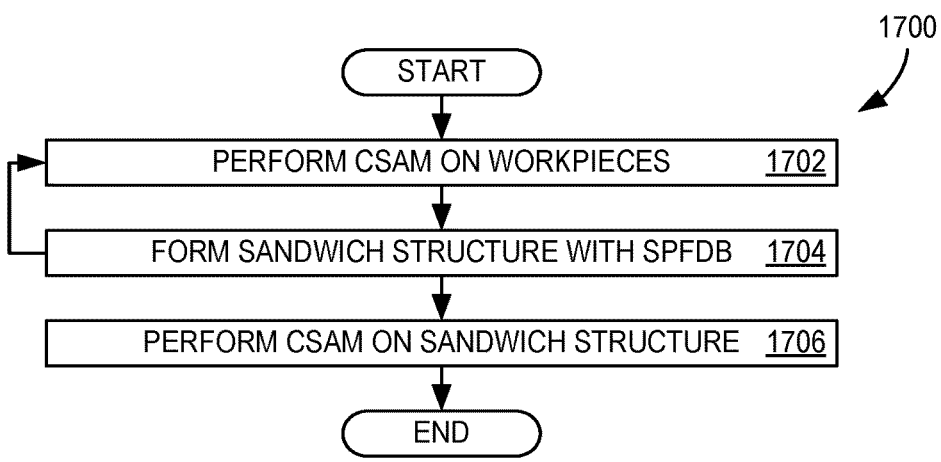
FIG. 17 is a flowchart illustrating a method of fabricating a sandwich structure using both SPFDB and CSAM.

FIG. 17 is a flowchart 1700 illustrating a method of fabricating the sandwich structure 1500 using both SPFDB and CSAM. In operation 1702, CSAM is performed to form at least whichever ones of the pads of additive material 1604, 1608, 1612, 1614, 1618, and 1618 will be obscured after the SPFDB process of operation 1702. Operation 1702 thus includes cold spraying an additive material onto at least one workpiece of a plurality of workpieces 110a-110d to be used in a sandwich structure (e.g., the sandwich structure 1402 or 1500). In one implementation, the cold spraying uses a helium or nitrogen gas.

In one implementation, the sandwich structure 1500 is formed in a single SPFDB operation 1704. In one implementation, the sandwich structure 1402 is formed in a first SPFDB operation 1704, permitting the addition of the pads of additive material 1612 and 1616 in a second pass through operation 1702, and then the sandwich structure 1500 is formed using the sandwich structure 1402 in a second SPFDB operation 1704. Operation 1704 thus includes superplastic forming and diffusion bonding the plurality of workpieces 110a-110d into the sandwich structure 1402 or 1500. In one implementation, the sandwich structure 1500 comprises a 4-sheet sandwich structure.

In operation 1706, a CSAM process is performed on the formed sandwich structure 1500 to add the pads of additive material 1602 and 1606, although the pads of additive material 1602 and 1606 could also have instead been formed in operation 1702. If only the pads of additive material 1602 and 1606 (and other pads in the corresponding locations) are to be used, then operation 1702 is optional. Therefore, each of operations 1702 and 1706 is optional, although at least one of operation 1702 and 1706 should be performed. Operation 1706 includes cold spraying an additive material onto the sandwich structure (e.g., the sandwich structure 1500, which was formed in a single operation 1704 or two passes through operation 1704).

In this manner, aspects of the disclosure may be used for multi-sheet SPFDB to form sandwich structures with internal pockets, for example, using four workpiece sheets to create 4-sheet sandwich structures (e.g., the sandwich structure 1500). CSAM may be used to form pads on at least some portions inside and/or outside of the sandwich structure 1500, for example on the insides or outsides of the face layers 1501 and 1504 and/or on the insides or outsides of the core layers 1502 and 1503.

Figure 18:
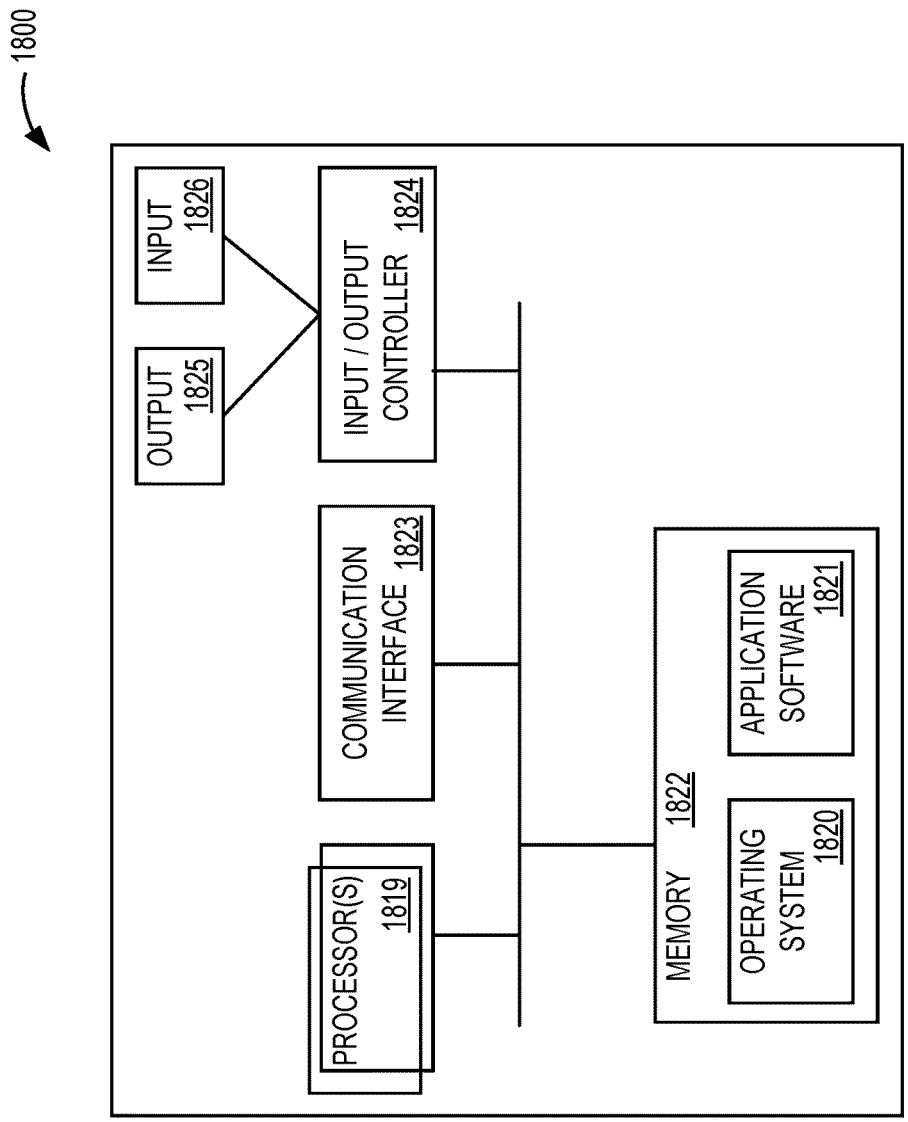
FIG. 18 is a block diagram of a computing device suitable for implementing various aspects of the disclosure.

With reference now to FIG. 18, a block diagram of the computing device 1800 suitable for implementing various aspects of the disclosure is described. In some implementations, the computing device 1800 includes one or more processors 1819 executing an operating system 1820 and application software 1821, which are held in a memory 1802. The disclosed implementations associated with the computing device 1800 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 18 and the references herein to a "computing device." The disclosed implementations are also practiced in distributed computing environments, where tasks are performed by remote-processing devices that are linked through a communications network. Further, while the computing device 1800 is depicted as a seemingly single device, in one implementation, multiple computing devices work together and share the depicted device resources. For instance, in one implementation, the memory 1822 is distributed across multiple devices, the processor(s) 1819 provided are housed on different devices, and so on.

In one implementation, the memory 1822 includes any of the computer-readable media described herein. In one implementation, the memory 1822 is used to store and access instructions configured to carry out the various operations disclosed herein. In some implementations, the memory 1822 includes computer storage media in the form of volatile and/or nonvolatile memory, removable or non-removable memory, data disks in virtual environments, or a combination thereof. In one implementation, the processor(s) 1819 includes any quantity of processing units that read data from various entities, such as the memory 1822, a communication interface 1823, or an input/output (I/O) controller 1824. Specifically, the processor(s) 1819 are programmed to execute computer-executable instructions for implementing aspects of the disclosure. In one implementation, the instructions are performed by multiple processors 1819 within the computing device 1800, or by processors 1819 external to the computing device 1800.

The communication interface 1823 allows the computing device 1800 to be logically coupled to other devices, for example over a wired or wireless network, that can be public or private and using a variety of protocols. The I/O controller 1824 provides for an output 1825 and an input 1826 that enables operation and control of the computing device 1800. One skilled in the art will understand and appreciate that computer data is presented in a number of ways, such as visually in a graphical user interface (GUI), audibly through speakers, and wirelessly or across a wired connection to a peripheral device. One skilled in the art will also understand and appreciate that computer input is received in a number of ways, such as via a microphone, a keyboard or keypad, a mouse or other pointer device, and a touchscreen. Although described in connection with the computing device 1800, implementations of the disclosure are capable of implementation with numerous other general-purpose or special-purpose computing system environments, configurations, or devices.

Figure 19:
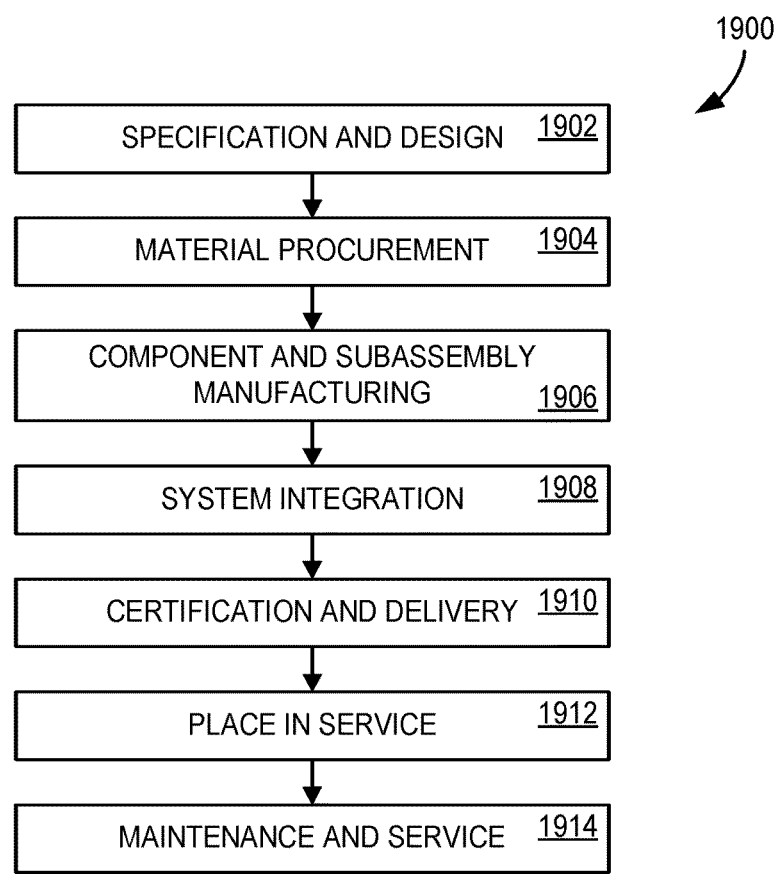
FIG. 19 is a block diagram of an apparatus production and service method that can employ various aspects of the disclosure.
Figure 20:
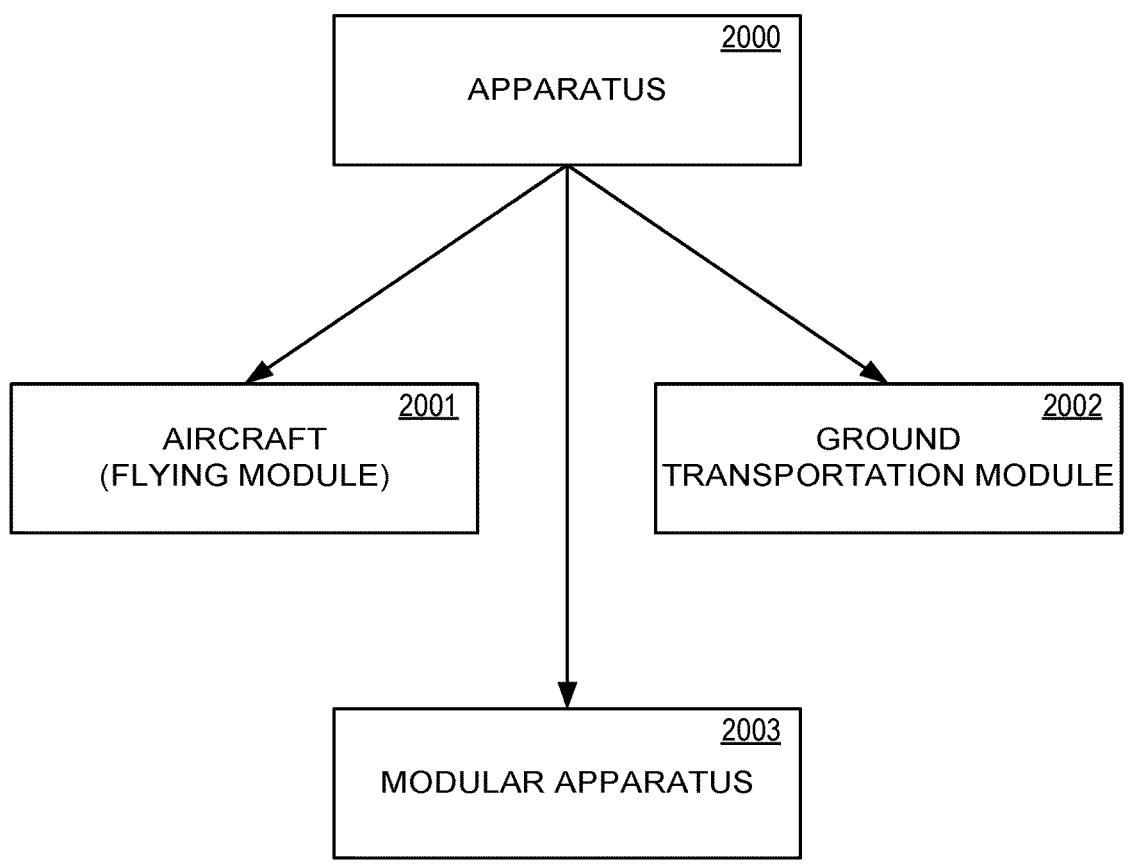
FIG. 20 is a block diagram of an apparatus for which various aspects of the disclosure can be employed.
Figure 21:
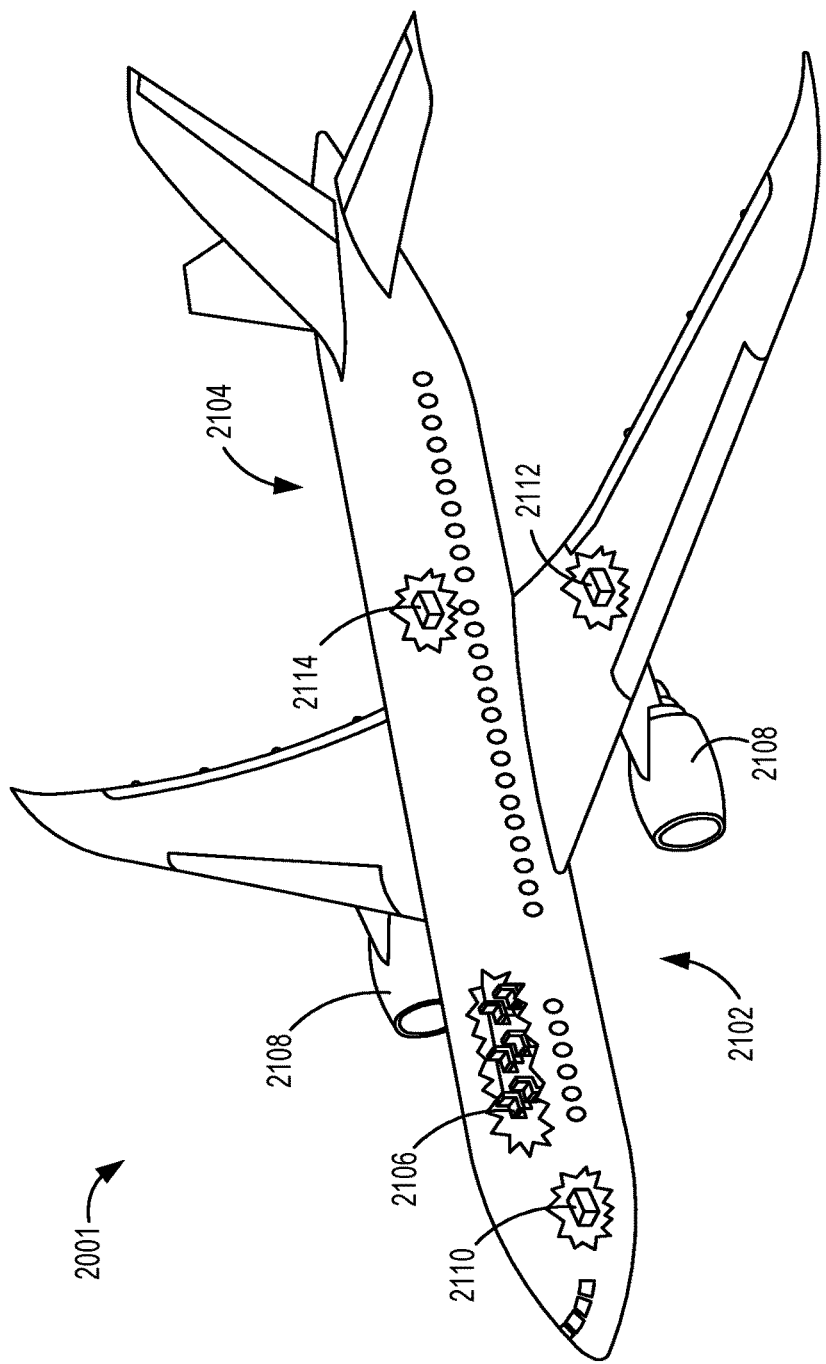
FIG. 21 is a schematic perspective view of a particular flying apparatus, introduced in relation to FIG. 20.

Some examples of the disclosure are used in manufacturing and service applications as shown and described in relation to FIGS. 19-21. Thus, implementations of the disclosure are described in the context of an apparatus of manufacturing and service method 1900 shown in FIG. 19 and apparatus 2000 shown in FIG. 20. In FIG. 19, a block diagram illustrating an apparatus manufacturing and service method 1900 is depicted in accordance with an implementation. In one implementation, during pre-production, the apparatus manufacturing and service method 1900 includes specification and design 1902 of the apparatus 2000 in FIG. 20 and material procurement 2004. During production, component and subassembly manufacturing 1906 and system integration 1908 of the apparatus 2000 in FIG. 20 takes place. Thereafter, the apparatus 2000 in FIG. 20 goes through certification and delivery 1910 in order to be placed in service 1912. While in service by a customer, the apparatus 2000 in FIG. 20 is scheduled for routine maintenance and service 1914, which, in one implementation, includes modification, reconfiguration, refurbishment, and other maintenance or service subject to configuration management, described herein.

In one implementation, each of the processes of the apparatus manufacturing and service method 1900 are performed or carried out by a system integrator, a third party, and/or an operator. In these implementations, the operator is a customer. For the purposes of this description, a system integrator includes any number of apparatus manufacturers and major-system subcontractors; a third party includes any number of venders, subcontractors, and suppliers; and in one implementation, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 20, the apparatus 2000 is described. As shown in FIG. 20, an example of the apparatus 2000 is a flying apparatus 2001, such as an aerospace vehicle, aircraft, air cargo, flying car, and the like. As also shown in FIG. 20, a further example of the apparatus 2000 is a ground transportation apparatus 2002, such as an automobile, a truck, heavy equipment, construction equipment, a boat, a ship, a submarine and the like. A further example of the apparatus 2000 shown in FIG. 20 is a modular apparatus 2003 that comprises at least one or more of the following modules: an air module, a payload module and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

With reference now to FIG. 21, a more specific diagram of the flying apparatus 2001 is depicted in which an implementation of the disclosure is advantageously employed. In this example, the flying apparatus 2001 is an aircraft produced by the apparatus manufacturing and service method 1900 in FIG. 19 and includes an airframe 2102 with a plurality of systems 2104 and an interior 2106. Implementations of the plurality of systems 2104 include one or more of a propulsion system 2108, an electrical system 2110, a hydraulic system 2112, and an environmental system 2114. However, other systems are also candidates for inclusion. Although an aerospace example is shown, different advantageous implementations are applied to other industries, such as the automotive industry, etc.

The implementations disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed implementations are practiced in a variety of system configurations, including personal computers, laptops, smart phones, mobile tablets, hand-held devices, consumer electronics, specialty computing devices, etc. The disclosed implementations are also practiced in distributed computing environments, where tasks are performed by remote-processing devices that are linked through a communications network.

The following paragraphs describe further aspects of the disclosure:

A1. A system for fabricating a finished workpiece having a shaped portion, the system comprising:
 a superplastic formation diffusion bonding (SPFDB) component;
 a cold spray additive manufacturing (CSAM) component; and
 a mold having a concavity;
 wherein the system is configured to:
  intake an unfinished workpiece;
  cold spray, with the CSAM component, an additive material onto the unfinished workpiece; and
  perform superplastic forming, with the SPFDB component, on the unfinished workpiece with the mold, thereby rendering the unfinished workpiece into the finished workpiece having the shaped portion, the shaped portion conforming to a shape defined by the concavity.

A2. The system of A1, wherein the unfinished workpiece comprises a metal substrate having a metal selected from the list consisting of:
 titanium, aluminum, and stainless steel.

A3. The system of A1, wherein the cold spraying of the additive material results in an increased thickness of the finished workpiece in a target region.

A4. The system of A3, wherein at least a portion of the target region overlaps with at least a portion of the shaped portion.

A5. The system of A3, wherein the increased thickness provides structural reinforcement of the finished workpiece in the target region.

A6. The system of A3, wherein the increased thickness of the finished workpiece in the target region is tapered at an edge of the target region.

A7. The system of A1, wherein the shaped portion is doubly curved.

A8. The system of A1, wherein the cold spraying uses a helium or nitrogen gas.

A9. The system of A1, wherein removing the finished workpiece from the mold comprises using a release agent to remove the finished workpiece from the mold.

A10. A method of fabricating a finished workpiece having a shaped portion, the method comprising:
 cold spraying an additive material onto an unfinished workpiece;
 positioning the unfinished workpiece on a mold having a concavity;
 superplastic forming the unfinished workpiece into the finished workpiece having the shaped portion, the shaped portion conforming to a shape defined by the concavity; and
 removing the finished workpiece from the mold, wherein the cold spraying of the additive material results in an increased thickness of the finished workpiece in a target region.

A11. The method of A10, wherein the unfinished workpiece comprises a metal substrate having a metal selected from the list consisting of:
 titanium, aluminum, and stainless steel.

A12. The method of A10, wherein at least a portion of the target region overlaps with at least a portion of the shaped portion.

A13. The method of A10, wherein the increased thickness of the finished workpiece in the target region is tapered at an edge of the target region.

A14. The method of A10, wherein the shaped portion is doubly curved.

A15. The method of A10, wherein the increased thickness provides structural reinforcement of the finished workpiece in the target region.

A16. The method of A10, wherein the cold spraying uses a helium or nitrogen gas.

A17. The method of A10, wherein removing the finished workpiece from the mold comprises using a release agent to remove the finished workpiece from the mold.

A18. A method of fabricating a finished workpiece having a shaped portion, the method comprising:
  cold spraying an additive material onto a mold having a concavity;
  positioning an unfinished workpiece on the mold;
  superplastic forming the unfinished workpiece and diffusively bonding the cold sprayed additive material with the unfinished workpiece, thereby rendering the unfinished workpiece into the finished workpiece having the shaped portion, the shaped portion conforming to a shape defined by the concavity; and
  removing the finished workpiece from the mold, wherein the cold spraying of the additive material results in an increased thickness of the finished workpiece in a target region.

A19. The method of A18, wherein the unfinished workpiece comprises a metal substrate having a metal selected from the list consisting of:
  titanium, aluminum, and stainless steel.

A20. The method of A18, wherein at least a portion of the additive material is cold sprayed into the concavity, and wherein at least a portion of the target region overlaps with at least a portion of the shaped portion.

A21. The method of A18, wherein the increased thickness provides structural reinforcement of the finished workpiece in the target region.

A22. The method of A18, wherein the cold spraying uses a helium or nitrogen gas.

A23. The method of A18, wherein the increased thickness of the finished workpiece in the target region is tapered at an edge of the target region.

A24. The method of A18, wherein the shaped portion is doubly curved.

A25. The method of A18, wherein removing the finished workpiece from the mold comprises using a release agent to remove the finished workpiece from the mold.

A26. A method of fabricating a finished workpiece having a shaped portion, the method comprising:
  positioning an unfinished workpiece on a mold having a concavity;
  superplastic forming the unfinished workpiece to form the shaped portion on the unfinished workpiece, the shaped portion conforming to a shape defined by the concavity;
  removing the unfinished workpiece from the mold; and
  cold spraying an additive material onto the unfinished workpiece, thereby rendering the unfinished workpiece into the finished workpiece, wherein the cold spraying of the additive material results in an increased thickness of the finished workpiece in a target region.

A27. The method of A26, wherein the unfinished workpiece comprises a metal substrate having a metal selected from the list consisting of:
  titanium, aluminum, and stainless steel.

A28. The method of A26, wherein at least a portion of the target region overlaps with at least a portion of the shaped portion.

A29. The method of A26, wherein the increased thickness of the finished workpiece in the target region is tapered at an edge of the target region.

A30. The method of A26, wherein the shaped portion is doubly curved.

A31. The method of A26, wherein the increased thickness provides structural reinforcement of the finished workpiece in the target region.

A32. The method of A26, wherein the cold spraying uses a helium or nitrogen gas.

A33. The method of A26, wherein removing the unfinished workpiece from the mold comprises using a release agent to remove the finished workpiece from the mold.

A34. A method of fabricating a finished workpiece having a shaped portion, the method comprising:
  placing cold sprayed additive material onto a mold having a concavity;
  positioning an unfinished workpiece on the mold;
  superplastic forming the unfinished workpiece and diffusively bonding the cold sprayed additive material with the unfinished workpiece, thereby rendering the unfinished workpiece into the finished workpiece having the shaped portion, the shaped portion conforming to a shape defined by the concavity; and
  removing the finished workpiece from the mold, wherein the cold spraying of the additive material results in an extended length of the finished workpiece relative to a length of the unfinished workpiece.

A35. The method of A34, wherein the unfinished workpiece comprises a metal substrate having a metal selected from the list consisting of:
  titanium, aluminum, and stainless steel.

A35. The method of A34, wherein placing cold sprayed additive material onto the mold comprises cold spraying additive material onto the mold.

A36. The method of A34, wherein placing cold sprayed additive material onto the mold comprises placing the cold sprayed additive material into the concavity.

A37. The method of A34, wherein the cold sprayed additive material is tapered at its edge.

A38. The method of A34, wherein the shaped portion is doubly curved.

A39. The method of A34, wherein the cold spraying uses a helium or nitrogen gas.

A40. The method of A34, wherein removing the finished workpiece from the mold comprises using a release agent to remove the finished workpiece from the mold.

A42. A method of fabricating a finished workpiece having a shaped portion, the method comprising:
  receiving requirements for the finished part;
  selecting a configuration for a CSAM component and an SPFDB component;
  configuring the CSAM component and the SPFDB component according to the selection;
  receiving an unfinished workpiece; and
  rendering the unfinished workpiece into the finished workpiece, wherein the rendering comprises:
    cold spraying, with the CSAM component, an additive material onto the unfinished workpiece; and
    perform superplastic forming, with the SPFDB component, on the unfinished workpiece with a mold.

A43. A method of fabricating a sandwich structure, the method comprising:

cold spraying an additive material onto at least one workpiece of a plurality of workpieces to be used in a sandwich structure;
superplastic forming and diffusion bonding the plurality of workpieces into the sandwich structure; and
cold spraying an additive material onto the sandwich structure.

A44. The method of A43, wherein the sandwich structure comprises a 4-sheet sandwich structure.

A45. The method of A43, wherein an increased thickness of the additive material provides structural reinforcement of the sandwich structure.

A46. The method of A43, wherein the cold spraying uses a helium or nitrogen gas.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of fabricating a finished workpiece having a shaped portion, the method comprising:
   cold spraying an additive material onto a concavity of a mold to form a deposit;
   positioning an unfinished workpiece on the mold;
   superplastic forming the unfinished workpiece into the finished workpiece having the shaped portion by placing the unfinished workpiece against the mold and diffusively bonding the deposit to the unfinished workpiece, the shaped portion conforming to a shape defined by the concavity; and
   removing the finished workpiece from the mold, wherein the cold spraying of the additive material results in an increased thickness of the finished workpiece in a target region.

2. The method of claim 1, wherein the unfinished workpiece comprises a metal substrate having a metal selected from the group consisting of: titanium, aluminum, and stainless steel.

3. The method of claim 1, wherein at least a portion of the target region overlaps with at least a portion of the shaped portion.

4. The method of claim 1, wherein the increased thickness of the finished workpiece in the target region is tapered at an edge of the target region.

5. The method of claim 1, wherein the increased thickness provides structural reinforcement of the finished workpiece in the target region.

6. The method of claim 1, wherein the cold spraying uses a helium or nitrogen gas.

7. A method of fabricating a finished workpiece having a shaped portion, the method comprising:
   positioning an unfinished workpiece on a mold having a concavity;
   superplastic forming the unfinished workpiece with the mold by placing a first surface of the unfinished workpiece against the mold to form the shaped portion on the unfinished workpiece, the shaped portion conforming to a shape defined by the concavity;
   removing the unfinished workpiece from the mold; and
   cold spraying an additive material onto the first surface of the unfinished workpiece, thereby rendering the unfinished workpiece into the finished workpiece, wherein the cold spraying of the additive material results in an increased thickness of the finished workpiece in a target region.

8. The method of claim 7, wherein the unfinished workpiece comprises a metal substrate having a metal selected from the group consisting of: titanium, aluminum, and stainless steel.

9. The method of claim 7, wherein at least a portion of the target region overlaps with at least a portion of the shaped portion.

10. The method of claim 7, wherein the increased thickness of the finished workpiece in the target region is tapered at an edge of the target region.

11. The method of claim 7, wherein the increased thickness provides structural reinforcement of the finished workpiece in the target region.

12. The method of claim 7, wherein the cold spraying uses a helium or nitrogen gas.

13. A method of fabricating a finished workpiece having a shaped portion, the method comprising:
   placing cold sprayed additive material onto a mold having a concavity to form a deposit;
   positioning an unfinished workpiece on the mold so that a first edge point of the unfinished workpiece contacts a corresponding edge point of the deposit;
   superplastic forming the unfinished workpiece into the finished workpiece having the shaped portion by placing the unfinished workpiece against the mold and diffusively bonding the first edge point of the unfinished workpiece to the corresponding edge point of the deposit, the shaped portion conforming to a shape defined by the concavity; and
   removing the finished workpiece from the mold, wherein the cold spraying of the additive material results in an extended length of the finished workpiece relative to a length of the unfinished workpiece.

14. The method of claim 13, wherein the unfinished workpiece comprises a metal substrate having a metal selected from the group consisting of: titanium, aluminum, and stainless steel.

15. The method of claim 13, wherein placing cold sprayed additive material onto the mold comprises cold spraying additive material onto the mold.

16. The method of claim 13, wherein placing cold sprayed additive material onto the mold comprises placing the cold sprayed additive material into the concavity.

17. The method of claim 13, wherein the cold sprayed additive material is tapered at its edge.

18. The method of claim 13, wherein the shaped portion is doubly curved.

19. The method of claim 13, wherein the cold spraying uses a helium or nitrogen gas.

20. The method of claim 13, wherein removing the finished workpiece from the mold comprises using a release agent to remove the finished workpiece from the mold.

* * * * *